US010513088B2

(12) United States Patent
Downs et al.

(10) Patent No.: US 10,513,088 B2
(45) Date of Patent: Dec. 24, 2019

(54) LIGHTWEIGHT LAMINATES AND PLATE-CARRIER VESTS AND OTHER ARTICLES OF MANUFACTURE THEREFROM

(71) Applicant: DSM IP Assets B.V., Heerlen (NL)

(72) Inventors: Roland Joseph Downs, Mesa, AZ (US); Christopher Michael Adams, Mesa, AZ (US); Keith Joel McDaniels, Phoenix, AZ (US)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 15/542,392

(22) PCT Filed: Jan. 8, 2016

(86) PCT No.: PCT/IB2016/000568
§ 371 (c)(1),
(2) Date: Jul. 7, 2017

(87) PCT Pub. No.: WO2016/113637
PCT Pub. Date: Jul. 21, 2016

(65) Prior Publication Data
US 2018/0022060 A1   Jan. 25, 2018

Related U.S. Application Data

(60) Provisional application No. 62/101,911, filed on Jan. 9, 2015.

(51) Int. Cl.
*B32B 5/08*     (2006.01)
*B32B 5/12*     (2006.01)
(Continued)

(52) U.S. Cl.
CPC ............... *B32B 5/08* (2013.01); *B32B 5/024* (2013.01); *B32B 5/12* (2013.01); *B32B 27/32* (2013.01);
(Continued)

(58) Field of Classification Search
CPC .... B32B 5/08; B32B 5/10; B32B 5/12; B32B 5/24; B32B 5/26; F41H 5/0471; F41H 5/0485
See application file for complete search history.

(56) References Cited

U.S. PATENT DOCUMENTS 1,287,945 A   12/1918 Ford
2,232,640 A   2/1941  Schwartzman
(Continued)

FOREIGN PATENT DOCUMENTS

CN    1727571      2/2006
CN    101723067    6/2010
(Continued)

OTHER PUBLICATIONS

U.S. Appl. No. 13/168,912 U.S. Pat. No. 8,784,968, filed Jun. 24, 2011 Jul. 22, 2014, Waterproof Breathable Composite Materials for Fabrication of Flexible Membranes and Other Articles.
(Continued)

*Primary Examiner* — Stephen Johnson
(74) *Attorney, Agent, or Firm* — Snell & Wilmer L.L.P.

(57) ABSTRACT

A lightweight laminate comprises: (a) a first outer layer; (b) at least one internal reinforcing layer; (c) optionally, one or more intervening film layers; and (d) a second outer layer, wherein the at least one internal reinforcing layer is disposed between first and second outer layers, and wherein the second outer layer is saturated, partially saturated and coated, or partially coated with a wet-out resin. Reinforcing layers can comprise unitape further comprising parallel
(Continued)

monofilaments embedded in resin. An article of manufacture, such as MOLLE, a plate-carrier, or other military, law enforcement, or recreational apparel or gear comprises the light-weight laminate.

23 Claims, 7 Drawing Sheets

(51) Int. Cl.
    *B32B 27/32*     (2006.01)
    *B32B 5/02*     (2006.01)
    *B32B 27/34*     (2006.01)
    *F41H 1/02*     (2006.01)
    *F41H 5/04*     (2006.01)

(52) U.S. Cl.
    CPC .............. *B32B 27/34* (2013.01); *F41H 1/02* (2013.01); *F41H 5/0478* (2013.01); *B32B 2255/02* (2013.01); *B32B 2255/26* (2013.01); *B32B 2262/0253* (2013.01); *B32B 2323/043* (2013.01); *B32B 2571/02* (2013.01)

(56) References Cited

U.S. PATENT DOCUMENTS

| | | | |
|---|---|---|---|
| 2,522,346 A | 9/1950 | Carson | |
| 2,584,632 A | 2/1952 | Southwick | |
| 2,679,194 A | 5/1954 | Ehrenfried | |
| 2,748,048 A | 5/1956 | Russel | |
| 3,335,045 A | 8/1967 | Post | |
| 3,644,165 A | 2/1972 | Chen | |
| 4,565,714 A | 1/1986 | Koshar | |
| 4,588,538 A | 5/1986 | Chung et al. | |
| 4,637,851 A | 1/1987 | Ueno | |
| 4,679,519 A | 7/1987 | Linville | |
| 4,708,080 A | 11/1987 | Conrad | |
| 4,757,742 A | 7/1988 | Mazelsky | |
| 4,762,751 A | 8/1988 | Girgis et al. | |
| 4,803,029 A | 2/1989 | Iversen | |
| 4,806,400 A | 2/1989 | Sancktar | |
| 4,991,317 A | 2/1991 | Lakic | |
| 5,001,003 A | 3/1991 | Mahr | |
| 5,025,575 A | 6/1991 | Lakic | |
| 5,094,883 A | 3/1992 | Muzzy et al. | |
| 5,106,568 A | 4/1992 | Honka | |
| 5,123,987 A | 6/1992 | Mattia | |
| 5,167,876 A | 12/1992 | Lem | |
| 5,173,138 A | 12/1992 | Blauch | |
| 5,198,280 A * | 3/1993 | Harpell .................. F41H 1/02 428/102 |
| 5,279,879 A | 1/1994 | Takezawa | |
| 5,333,568 A | 8/1994 | Meldner et al. | |
| 5,362,527 A * | 11/1994 | Harpell .................. B32B 3/22 428/33 |
| 5,403,641 A | 4/1995 | Linville et al. | |
| 5,419,726 A | 5/1995 | Switlik | |
| 5,470,632 A | 11/1995 | Meldner et al. | |
| 5,514,431 A | 5/1996 | Shimomura | |
| 5,591,933 A | 1/1997 | Li et al. | |
| 5,729,834 A | 3/1998 | Sloot | |
| 5,922,161 A | 7/1999 | Wu et al. | |
| 6,014,823 A | 1/2000 | Lakic | |
| 6,048,622 A | 4/2000 | Hagood | |
| 6,071,834 A | 6/2000 | Martz | |
| 6,168,855 B1 | 1/2001 | Cohen | |
| 6,224,951 B1 | 5/2001 | Centanni et al. | |
| 6,361,642 B1 | 3/2002 | Bellamy et al. | |
| 6,565,944 B1 | 5/2003 | Hartness et al. | |
| 6,627,034 B1 | 9/2003 | Ufer | |
| 6,761,795 B2 | 7/2004 | Chapuis et al. | |
| 6,846,548 B2 | 1/2005 | Harpell et al. | |
| 7,156,787 B2 | 1/2007 | Kemery et al. | |
| 7,226,878 B2 | 6/2007 | Wagner et al. | |
| 7,601,416 B2 | 10/2009 | Palley | |
| 7,622,014 B2 | 11/2009 | Millette | |
| 7,892,374 B2 | 2/2011 | Pekar | |
| 7,985,463 B2 | 7/2011 | Stowell et al. | |
| 8,080,487 B2 | 12/2011 | Gardner et al. | |
| 8,147,644 B2 | 4/2012 | Tippins | |
| 8,256,019 B2 | 9/2012 | Ardiff et al. | |
| 8,343,574 B2 | 1/2013 | Downs et al. | |
| 8,540,838 B2 | 9/2013 | Millette | |
| 8,572,786 B2 | 11/2013 | Davis et al. | |
| 8,784,968 B2 | 7/2014 | Adams et al. | |
| 8,802,189 B1 | 8/2014 | Downs et al. | |
| 9,079,218 B2 | 7/2015 | Downs et al. | |
| 9,114,570 B2 | 8/2015 | Downs et al. | |
| 9,154,593 B1 | 10/2015 | Meldner | |
| 9,261,333 B2 * | 2/2016 | Guo ...................... F41H 5/0485 |
| 9,339,842 B2 | 5/2016 | Downs et al. | |
| 9,358,755 B2 | 6/2016 | Adams et al. | |
| 2002/0182955 A1 | 12/2002 | Weglewski et al. | |
| 2003/0022578 A1 | 1/2003 | Lubker, II | |
| 2003/0064188 A1 | 4/2003 | Patel et al. | |
| 2004/0012118 A1 | 1/2004 | Perez | |
| 2004/0084138 A1 | 5/2004 | Henke et al. | |
| 2004/0102125 A1 | 5/2004 | Morman et al. | |
| 2004/0171321 A1 | 9/2004 | Plant | |
| 2005/0112968 A1 | 5/2005 | Panse | |
| 2006/0191427 A1 | 8/2006 | Geddes et al. | |
| 2007/0184263 A1 | 8/2007 | Rodewald et al. | |
| 2007/0278155 A1 | 12/2007 | Lo et al. | |
| 2007/0290942 A1 | 12/2007 | Morin | |
| 2008/0081171 A1 | 4/2008 | DuPont | |
| 2008/0116043 A1 | 5/2008 | Chahal et al. | |
| 2008/0118639 A1 | 5/2008 | Arvidson et al. | |
| 2008/0230173 A1 | 9/2008 | Cho et al. | |
| 2009/0042471 A1 | 2/2009 | Cashin et al. | |
| 2009/0047483 A1 | 2/2009 | Sugahara et al. | |
| 2009/0169825 A1 | 7/2009 | Farmer et al. | |
| 2009/0169835 A1 | 7/2009 | Stowell et al. | |
| 2009/0218672 A1 | 9/2009 | Nakamura | |
| 2010/0003452 A1 * | 1/2010 | Jongedijk ............ B29C 43/003 428/107 |
| 2010/0028593 A1 | 2/2010 | Takata et al. | |
| 2010/0304072 A1 | 2/2010 | Alvelind | |
| 2010/0112283 A1 | 5/2010 | Howarth | |
| 2010/0152654 A1 | 6/2010 | Tilson et al. | |
| 2010/0168704 A1 | 7/2010 | Thomas et al. | |
| 2010/0222522 A1 | 9/2010 | Steele | |
| 2011/0048220 A1 * | 3/2011 | Dickson .................. B32B 5/12 89/36.02 |
| 2011/0162516 A1 * | 7/2011 | St. Claire ............ F41H 5/0485 89/36.02 |
| 2011/0312238 A1 | 12/2011 | Bader et al. | |
| 2012/0100334 A1 | 4/2012 | Adams et al. | |
| 2012/0110721 A1 * | 5/2012 | Takahashi ............... B32B 5/024 2/458 |
| 2012/0118615 A1 | 5/2012 | Lee et al. | |
| 2012/0150169 A1 | 6/2012 | Chiou | |
| 2012/0169552 A1 | 7/2012 | Lee | |
| 2012/0174753 A1 | 7/2012 | Wagner et al. | |
| 2012/0186430 A1 | 7/2012 | St. Claire et al. | |
| 2012/0276380 A1 | 11/2012 | Traser et al. | |
| 2013/0126533 A1 | 5/2013 | Klosky | |
| 2014/0087616 A1 | 3/2014 | Adams et al. | |
| 2014/0119703 A1 | 5/2014 | Hinaga | |
| 2014/0134378 A1 | 5/2014 | Downs et al. | |
| 2014/0262011 A1 * | 9/2014 | Lewit .................. B29B 15/10 156/275.5 |
| 2014/0308510 A1 | 10/2014 | Downs et al. | |
| 2014/0311329 A1 | 10/2014 | Dyke et al. | |
| 2014/0335750 A1 * | 11/2014 | Adams .................. B32B 5/022 442/57 |
| 2014/0363615 A1 | 12/2014 | Adams et al. | |
| 2015/0010706 A1 | 1/2015 | Downs et al. | |
| 2015/0082976 A1 | 3/2015 | Downs et al. | |
| 2015/0083473 A1 | 3/2015 | Downs et al. | |
| 2015/0266053 A1 | 9/2015 | Downs et al. | |
| 2015/0273794 A1 * | 10/2015 | Chien .................. B32B 5/26 428/113 |
| 2015/0275051 A1 | 10/2015 | Downs | |

(56) References Cited

U.S. PATENT DOCUMENTS

| | | | |
|---|---|---|---|
| 2016/0001472 | A1 | 1/2016 | Downs et al. |
| 2016/0023428 | A1 | 1/2016 | Adams et al. |
| 2016/0031164 | A1 | 2/2016 | Downs et al. |
| 2016/0033236 | A1 | 2/2016 | Meldner et al. |
| 2016/0037633 | A1 | 2/2016 | Downs et al. |

FOREIGN PATENT DOCUMENTS

| | | |
|---|---|---|
| DE | 4010086 | 11/1990 |
| DE | 202011004434 | 6/2011 |
| EP | 0361796 | 4/1990 |
| EP | 0515992 | 12/1992 |
| EP | 0579047 | 1/1994 |
| EP | 0699877 | 3/1996 |
| EP | 0967071 | 12/1999 |
| EP | 2133464 | 12/2009 |
| GB | 2051674 | 1/1981 |
| JP | 57027738 | 2/1928 |
| JP | 01123727 | 5/1989 |
| JP | 0446202 | 7/1992 |
| JP | 2000234257 | 8/2000 |
| JP | 2002539036 | 11/2002 |
| JP | 2004218170 | 8/2004 |
| JP | 2006322077 | 11/2006 |
| JP | 2007135213 | 5/2007 |
| JP | 2007321652 | 12/2007 |
| JP | 2008274516 | 11/2008 |
| JP | 2011245745 | 12/2011 |
| WO | 1988009630 | 12/1988 |
| WO | 1994011185 | 5/1994 |
| WO | 1998030397 | 7/1998 |
| WO | 2000002427 | 1/2000 |
| WO | 2001028196 | 4/2001 |
| WO | 2002047899 | 6/2002 |
| WO | 2003005684 | 1/2003 |
| WO | 2007122009 | 10/2008 |
| WO | 2008116702 | 10/2008 |
| WO | 2009059402 | 5/2009 |
| WO | 2011076914 | 6/2011 |
| WO | 2011163643 | 12/2011 |
| WO | 2012017233 | 2/2012 |
| WO | 2012018959 | 2/2012 |
| WO | 2012150169 | 11/2012 |
| WO | 2014044688 | 3/2014 |
| WO | 2014047227 | 3/2014 |
| WO | 2014047663 | 3/2014 |
| WO | 2014084947 | 6/2014 |
| WO | 2014074966 | 7/2014 |
| WO | 2014160483 | 10/2014 |
| WO | 2014160492 | 10/2014 |
| WO | 2014160498 | 10/2014 |
| WO | 2014160506 | 10/2014 |

OTHER PUBLICATIONS

U.S. Appl. No. 14/309,578 U.S. Pat. No. 9,358,755, filed Jun. 19, 2014 Jun. 7, 2016, Waterproof Breathable Composite Materials for Fabrication of Flexible Membranes and Other Articles.

U.S. Appl. No. 13/197,741 U.S. Pat. No. 8,343,574, filed Aug. 3, 2011 Jan. 1, 2013, System and Method for the Transfer of Color and Other Physical Properties to Laminate Composite Materials and Other Articles.

U.S. Appl. No. 14/031,040, filed Sep. 18, 2013, Flexible Composite Systems.

U.S. Appl. No. 14/430,340, filed Mar. 23, 2015, Adherable Flexible Composite Systems.

U.S. Appl. No. 14/076,201 U.S. Pat. No. 9,114,570, filed Nov. 9, 2013 Aug. 25, 2015, Systems and Method for Producing Three-Dimensional Articles From Flexible Composite Materials.

U.S. Appl. No. 13/727,919 U.S. Pat. No. 8,802,189, filed Dec. 27, 2012 Aug. 12, 2014, System and Method for the Transfer of Color and Other Physical Properties to Laminate Composite Materials and Other Articles.

U.S. Appl. No. 14/326,261 U.S. Pat. No. 9,079,218, filed Jul. 8, 2014 Jul. 14, 2015, System and Method for the Transfer of Color and Other Physical Properties to Laminate Composite Materials and Other Articles.

U.S. Appl. No. 14/732,210 U.S. Pat. No. 9,339,842, filed Jun. 5, 2015 May 17, 2016, System and Method for the Transfer of Color and Other Physical Properties to Laminate Composite Materials and Other Articles.

U.S. Appl. No. 14/774,490, filed Sep. 10, 2015, Systems and Method for Producing Three-Dimensional Articles from Flexible Composite Materials.

U.S. Appl. No. 14/207,790, filed Mar. 13, 2014, Engineered Composite Systems.

U.S. Appl. No. 14/774,562, filed Sep. 10, 2015, Light-Weight Semi-Rigid Composite Anti-Ballistic Systems With Engineered Compliance and Rate-Sensitive Impact Response.

U.S. Appl. No. 14/208,017, filed Mar. 13, 2014, Light-Weight Semi-Rigid Composite Anti-Ballistic Systems With Engineered Compliance and Rate-Sensitive Impact Response.

U.S. Appl. No. 14/774,581, filed Sep. 10, 2015, Flexible Composite Systems and Methods.

U.S. Appl. No. 14/207,891, filed Mar. 13, 2014, Flexible Composite Systems.

U.S. Appl. No. 14/774,594, filed Sep. 10, 2015, Flexible Electronic Fiber-Reinforced Composite Materials.

U.S. Appl. No. 14/208,107, filed Mar. 13, 2014, Flexible Electronic Fiber-Reinforced Composite Materials.

U.S. Appl. No. 13/922,128, filed Jun. 19, 2013, Flotation and Related Integrations to Extend the Use of Electronic Systems.

USPTO; Non-Final Office Action dated Sep. 10, 2013 in U.S. Appl. No. 13/168,912.

USPTO; Notice of Allowance dated Mar. 21, 2014 in U.S. Appl. No. 13/168,912.

USPTO; Office Action dated Mar. 21, 2012 in U.S. Appl. No. 13/197,741.

USPTO; Notice of Allowance dated Oct. 4, 2012 in U.S. Appl. No. 13/197,741.

USPTO; Office Action dated Jul. 17, 2013 in U.S. Appl. No. 13/727,919.

USPTO; Office Action dated Dec. 20, 2013 in U.S. Appl. No. 13/727,919.

USPTO; Notice of Allowance dated Apr. 11, 2014 in U.S. Appl. No. 13/727,919.

USPTO; Non-Final Office Action dated Jan. 14, 2015 in U.S. Appl. No. 13/922,128.

USPTO; Notice of Allowance dated Jun. 1, 2015 in U.S. Appl. No. 13/922,128.

USPTO; Non-Final Office Action dated May 8, 2015 in U.S. Appl. No. 14/031,040.

USPTO; Final Office Action dated Nov. 25, 2015 in U.S. Appl. No. 14/031,040.

USPTO; Non-Fial Office Action dated Jun. 3, 2016 in U.S. Appl. No. 14/031,040.

USPTO; Final Office Action dated Nov. 15, 2016 in U.S. Appl. No. 14/031,040.

USPTO; Notice of Allowance dated Apr. 24, 2015 in U.S. Appl. No. 14/076,201.

USPTO; Non-Final Office Action dated Nov. 18, 2016 in U.S. Appl. No. 14/207,790.

USPTO; Non-Final Office Action dated Mar. 10, 2017 in U.S. Appl. No. 14/207,891.

USPTO; Non-Final Office Action dated Jul. 17, 2015 in U.S. Appl. No. 14/208,017.

USPTO; Final Office Action dated Feb. 12, 2016 in U.S. Appl. No. 14/208,017.

USPTO; Non-Final Office Action dated Sep. 9, 2016 in U.S. Appl. No. 14/208,107.

USPTO; Final Office Action dated Apr. 28, 2017 in U.S. Appl. No. 14/208,107.

USPTO; Non-Final Office Action dated Jan. 6, 2016 in U.S. Appl. No. 14/309,578.

USPTO; Notice of Allowance dated Feb. 8, 2016 in U.S. Appl. No. 14/309,578.

(56) References Cited

OTHER PUBLICATIONS

USPTO; Non-Final Office Action dated Nov. 19, 2014 in U.S. Appl. No. 14/326,261.
USPTO; Notice of Allowance dated Mar. 10, 2015 in U.S. Appl. No. 14/326,261.
USPTO; Non-Final Office Action dated Oct. 4, 2016 in U.S. Appl. No. 14/430,340.
USPTO; Non-Final Office Action dated Jul. 30, 2015 in U.S. Appl. No. 14/732,210.
USPTO; Notice of Allowance dated Jan. 21, 2016 in U.S. Appl. No. 14/732,210.
USPTO; Non-Final Office Action dated Feb. 2, 2016 in U.S. Appl. No. 14/774,562.
USPTO; Final Office Action dated Dec. 1, 2016 in U.S. Appl. No. 14/774,562.
USPTO; Non-Final Office Action dated May 1, 2017 in U.S. Appl. No. 14/774,594.
USPTO; Non-Final Office Action dated Apr. 4, 2017 in U.S. Appl. No. 14/791,025.
PCT; International Search Report dated Feb. 10, 1994 in Application No. PCT/US1993/011425.
PCT; International Search Report dated Oct. 31, 2011 in Application No. PCT/US2011/041914.
PCT; Written Opinion of the International Search Authority dated Oct. 31, 2011 in Application No. PCT/US2011/041914.
PCT; International Preliminary Report on Patentability dated May 17, 2012 in Application No. PCT/US2011/041914.
PCT; International Search Report dated Dec. 16, 2011 in Application No. PCT/US2011/046497.
PCT; Written Opinion of the International Searching Authority dated Dec. 16, 2011 in Application No. PCT/US2011/046497.
PCT; International Search Report and Written Opinion dated Feb. 21, 2014 in Application No. PCT/US2013/061509.
PCT; International Search Report and Written Opinion dated Feb. 28, 2014 in Application No. PCT/US2013/060487.
PCT; International Search Report and Written Opinion dated May 7, 2014 in Application No. PCT/US2013/069364.
PCT; International Search Report and Written Opinion dated Aug. 14, 2014 in Application No. PCT/US2014/026796.
PCT; International Search Report and Written Opinion dated Aug. 11, 2014 in Application No. PCT/US2014/026828.
PCT; International Search Report and Written Opinion dated Aug. 20, 2014 in Application No. PCT/US2014/026856.
PCT; International Search Report and Written Opinion dated Dec. 11, 2014 in Application No. PCT/US2014/026870.
PCT; International Search Report and Written Opinion dated Jul. 4, 2016 in Application No. PCT/IB2016/000568.
PCT; International Search Report and Written Opinion dated Aug. 26, 2016 in Application No. PCT/IB2016/000919.
EPO; Supplementary European Search Report dated Jul. 27, 1995 in Application No. EP 94902379.
EPO; Office Action dated Apr. 4, 1997 in Application No. EP 94902379.
EPO; Office Action dated Jul. 22, 1998 in Application No. EP 94902379.
EPO; Office Action dated Jun. 17, 1999 in Application No. EP 94902379.
EPO; Office Action dated Aug. 17, 2000 in Application No. EP 94902379.
EPO; Extended Search Report dated Feb. 19, 2016 in Application No. EP 11815290.9.
EPO; European Search Report dated Jan. 7, 2015 in Application No. EP 11799030.9.
EPO; European Search Report dated May 3, 2016 in Application 13839426.7.
EPO; European Search Report dated Jun. 8, 2016 in Application No. 13838954.9.
CPO; Office Action dated Apr. 2, 2014 in Application No. CN 201180037975.6.
CPO; Office Action dated Nov. 15, 2014 in Application No. CN 201180037975.6.
CPO; Office Action dated Jun. 6, 2014 in Application No. CN 201180031205.0.
CPO; Office Action dated Oct. 8, 2014 in Application No. CN 201180031205.0.
Bralla, "Handbook of Manufacturing Processes—How Products, Compotents and Materials are Made," Industrial Press, pp. 411, (2007).
Chawla, "Composite Materials" Science and Engineering, Third Edition, Springer, 7-68 (2012).
eFunda, "Polymers Sorted by Thermoplastic/ Thermoset," pp. 1-2, (2008).
Elaldi et al., "Machining and Joining Process," Smithers Rapra Technology, 7, pp. 163-181, (2001).
Huntsman, "Modification of Polyolefins with Elastamine Polyetheramines," pp. 1-3, (2009).
Sanborn et al., "Tensile Prperties of Dyneema SK76 Single Fibers at Multiple Loading Rates Using a Dirct Gripping Method", J. Dynamic Behavior Mater. 2: 4-14 (2015).
Schaefer, "Nip Rolls," pp. 1, (2009).
Tomsic, "Dictionary of Materials and Testing," SAE International, 2, pp. 205, (2000).
Troughton, "Handbook of Plastics Joining—A Practical Guide: Chapter 17 A160—Adhesive Bonding," William Andrew Publishing, 2, pp. 145-173, (2008).

* cited by examiner

LIGHTWEIGHT LAMINATES AND PLATE-CARRIER VESTS AND OTHER ARTICLES OF MANUFACTURE THEREFROM

CROSS REFERENCE TO RELATED APPLICATIONS

This application is a U.S. National Phase filing under 35 U.S.C. § 371 of PCT International Application No. PCT/IB2016/000568, filed on Jan. 8, 2016, and claims benefit to U.S. Provisional Application No. 62/101,911, filed Jan. 9, 2015, which is hereby incorporated by reference in its entirety.

FIELD OF THE INVENTION

The present disclosure relates generally to laminates and in particular to lightweight, reinforced laminates usable for plate-carrier vests and other articles of manufacture.

BACKGROUND OF THE INVENTION

Laminates usable for military gear such as plate-carrier vests need to be lightweight, tear resistant, fray resistant, amendable to colorizing and cutting, waterproof and, often, fireproof and/or self-extinguishing.

A number of plate-carrier vests in the market today are manufactured from a composite comprising nylon woven, such as Cordura® nylon, and Kevlar®. Even with the addition of a rubberized layer, these articles may experience poor tear strength, excessive edge fray, heavy weight, and "boardiness" (stiffness and/or an otherwise uncomfortable rigidity). Further, such products may not be entirely waterproof and may not allow proper passage of gasses such as water vapor.

Often, the rubberizing of a woven layer, such as through use of extruded rubber, is ineffective to bond into the fibers of woven fabric, leaving a pathway for water to wick in between the nylon and rubber layers where it can remain for extended periods of time, sufficient time for that moisture to degrade the bond between the fibers and resin matrix or constituent materials. Further, since rubberizing fabrics fails to fully penetrate the weave, the finished fabric can fray can have stray fibers when cut or ripped. This is problematic when such fabrics require cutting in the production of finished goods such as military Modular Lightweight Load-Carrying Equipment (MOLLE), or many other military and recreation apparel and gear. Fibers left hanging can be pulled completely out of the fabric, weakening the fabric and producing more entry points for liquid water. Fibers left hanging from the edge can snag and possibly jam other equipment.

Further, many coated fabrics used to produce MOLLE and other gear are not cost effective for the manufacturer because each uniquely colored and patterned article (for example, a single plate-carrier vest in standard Multicam®) must be produced in very large-scale single manufacturing runs. To change to another color/pattern (e.g. white camouflage pattern) for the same vest, additional costs are incurred to change out the lines and the materials to accommodate just a simple color and/or pattern change.

Therefore, new lightweight laminates usable for plate-carrier vests and other articles of manufacture are desired. In particular, lightweight materials are still needed that are waterproof/breathable, amenable to cutting and coloring, are that are tear resistant, fire retardant, and not prone to melting.

SUMMARY OF THE INVENTION

In various embodiments of the present disclosure, a lightweight laminate comprises: (a) a first outer layer; and (b) a second outer layer laminated to the first outer layer, wherein said second outer layer is saturated, partially saturated and coated, or partially coated, with a wet-out resin. In various embodiments, the second outer layer comprises a pre-preg. In various embodiments, the lightweight laminate further comprises a backside film bonded to the exposed side of the second outer layer. In various embodiments, the wet-out resin within the second outer layer assists in the bonding of the backside film to the second outer layer. In various embodiments, an intervening film layer is disposed between the first and second outer layers, which may melt during lamination and/or assist in bonding of layers, or which may remain disposed between layers to provide slippage between layers and/or to provide other physical attributes to the lightweight laminate.

In various embodiments of the present disclosure, a lightweight laminate comprises: (a) a first outer layer; and (b) a second outer layer laminated to the first outer layer, wherein said second outer layer is saturated, partially saturated and coated, or partially coated, with a wet-out resin infiltrated into the second outer layer from at least one of: (i) a high resin content unitape in contact with either or both sides of the second outer layer; (ii) a resin coated onto, or resin film applied to, the side of the second outer layer opposite the first outer layer; or (iii) a backside film layer placed into contact with the side of the second outer layer opposite the first outer layer. In various embodiments, an intervening film layer is disposed between the first and second outer layers, which may melt during lamination and/or assist in bonding of layers, or which may remain disposed between layers to provide slippage between layers and/or to provide other physical attributes to the lightweight laminate.

In various embodiments of the present disclosure, a lightweight laminate comprises: (a) a first outer layer; (b) a second outer layer in contact with the first outer layer to form a layered stack; and (c) a wet-out resin disposed on or within the second outer layer. In various embodiments, wet-out resin originates from hand or machine application, or infiltration from a high resin content unitape adjacent thereby, or a backside film layer placed into contact with the side of the second outer layer opposite the first outer layer. In various embodiments, wet-out resin moves from an adjacent layer into the second outer layer, assisted for example by processes comprising pressures above atmospheric, (e.g. autoclave, belt press, nip rollers, and the like). In various embodiments, the second outer layer is applied in a relatively In various embodiments of the present disclosure, a lightweight laminate comprises: (a) a first outer layer; (b) at least one internal reinforcing layer; (c) a second outer layer, said at least one internal reinforcing layer disposed between first and second outer layers; and, (d) a wet-out resin on and/or in the second outer layer. In various embodiments, wet-out resin originates from hand or machine application, or infiltration from a high resin content unitape adjacent thereby, or a backside film layer placed into contact with the side of the second outer layer opposite the first outer layer. In various embodiments, the at least one internal reinforcing layer comprises a unidirectional tape (unitape) further comprising parallel monofilaments embedded in a resin, often also referred to as resin matrix. In various embodiments, at least one intervening film layer is disposed between the first outer layer and an internal reinforcing layer, and/or between internal reinforcing layers (when there is more than one present), and/or between the second outer layer and an internal reinforcing layer. The one or more intervening film layers may melt during lamination and/or assist in bonding of various layers, or one or more film layers may remain disposed between layers to provide slippage between layers and/or to provide other physical attributes to the lightweight laminate.

In various embodiments of the present disclosure, a lightweight laminate comprises: (a) a first outer layer; (b) at least one internal reinforcing layer; and (c) a second outer layer, wherein said internal reinforcing layer(s) is/are disposed between first and second outer layers, and wherein the second outer layer is saturated, partially saturated and coated, or partially coated, with a wet-out resin. In various embodiments, the second outer layer comprises a pre-preg. In various embodiments, the lightweight laminate further comprises a backside film bonded to the exposed side of the second outer layer. In various embodiments, the wet-out resin within the second outer layer assists in the bonding of the backside film to the second outer layer. In various embodiments, at least one intervening film layer is disposed between the first outer layer and an internal reinforcing layer, and/or between internal reinforcing layers (when there is more than one present), and/or between the second outer layer and an internal reinforcing layer. The one or more intervening film layers may melt during lamination and/or assist in bonding of various layers, or one or more film layers may remain disposed between layers to provide slippage between layers and/or to provide other physical attributes to the lightweight laminate.

In various embodiments, the first outer layer provides at least one of texture, color and pattern. In various embodiments, the first outer layer comprises woven nylon Multicam® camouflage material. In various embodiments, the first outer layer comprises any woven fabric or nonwoven material. In various embodiments, the first outer layer comprises high tenacity fibers. In various embodiments, the first outer layer is absent any color or texture, and may be colored or patterned at any time in the manufacture of the lightweight laminate, or at any other time along the route to a finished article of manufacturer.

In various embodiments, internal reinforcing layers comprise unidirectional tape (unitape) layers comprising reinforcing monofilaments. It is clear to those persons skilled in the art that monofilaments may also be applied in the form of fibers, yarns or filaments. In various embodiments, unitape layers comprise parallel monofilaments embedded in a resin. In various embodiments, multiple unitape layers are stacked with particular orientation of their fiber directions and bonded together to form a reinforcing core within the lightweight laminate. In various embodiments, one or more intervening film layers are disposed between adjacent unitape layers. The one or more intervening film layers may melt or otherwise assist in bonding adjacent unitape layers, or may remain disposed between unitape layers to provide slippage and/or to impart other physical attributes to the lightweight laminate.

In various embodiments, each unitape layer may comprise a single type of fiber, such as for example, fibers comprising only aramid or UHMWPE monofilaments. In various embodiments, any one or more of the unidirectional tape layers may comprise different types of fibers. "Different," as used in reference to fiber types, refers broadly to fibers having one or more different characteristics, such as, polymer composition, chemical composition, crystallinity, axial orientation, denier, strength, diameter, fiber treatment, surface architecture, and the like. In various embodiments, fibers or yarns may be hybridized fibers in that they comprise multiple types of filaments or monofilaments within each yarn or fiber.

In various embodiments, a lightweight laminate further comprises a backside film bonded to the second outer layer, wherein the wet-out resin within the second outer layer may optionally participate in the bonding of the backside film to the second outer layer. In various embodiments, the wet-out resin within the second outer layer originated exclusively, substantially, or at least partly from the backside film.

In various embodiments of the present disclosure, a sub-laminate comprises: (a) at least one internal reinforcing layer; and (b) a second outer layer, wherein said second outer layer is saturated, partially saturated and coated, or partially coated, with a wet-out resin. In various embodiments, the sub-laminate is provided as a roll good to a third party to complete manufacture of a lightweight laminate. In various embodiments, a first outer layer is later bonded to the sub-laminate on the side opposite the second outer layer, to complete a sandwich structure comprising (in ordered layer sequence): (i) a first outer layer; (ii) at least one internal reinforcing layer; and (iii) a second outer layer. This later lamination of the first outer layer onto the sub-laminate may be at a third-party manufacturer, such as for example, the manufacturer of plate-carrier vests or other articles. In this way, the third-party manufacturer can purchase the sub-laminate as roll goods and then run small batches of finished goods having different colors and patterns. In various embodiments, one or more film layers may be applied to the sub-laminate prior to lamination of a first outer layer.

In various embodiments of the present disclosure, an article of manufacture comprises: (a) a lightweight laminate comprising: (i) a first outer layer; (ii) at least one internal reinforcing layer; and (iii) a second outer layer; and (b) hardware (for example, straps, buckles, or Velcro®, etc.), a soft item (for example, PALS webbing, pockets, or netting), or any other accessory required for a particular article design/configuration/function, attached to the lightweight laminate, wherein the at least one internal reinforcing layer is disposed between the first and second outer layers, and wherein the second outer layer is saturated, partially saturated and coated, or partially coated, with a wet-out resin infiltrated into the second outer layer from at least one of: (i) a high resin content unitape in contact with either or both sides of the second outer layer; (ii) a resin coated onto, or resin film applied to, the side of the second outer layer opposite the first outer layer; or (iii) a backside film layer placed into contact with the side of the second outer layer opposite the first outer layer. In various embodiments, the lightweight laminate further comprises one or more intervening film layers disposed in any combination between adjacent layers to provide bonding and/or other processes, and/or to provide various physical attributes to the finished lightweight laminate.

In various embodiments of the present disclosure, an article of manufacture comprises a plate-carrier vest, Modular Lightweight Load-Carrying Equipment (MOLLE), or any other tactical or recreational gear such as, for example, a backpack, a tent, a rucksack, a pouch, and the like.

In various embodiments, a method of producing a lightweight laminate comprises laminating together (a) a first outer layer; (b) at least one internal reinforcing layer; and (c) a second outer surface layer, wherein the at least one internal reinforcing layer is disposed between first and second outer layers, and wherein the second outer layer is saturated, partially saturated and coated, or partially coated, with a wet-out resin infiltrated into the second outer layer from at least one of: (i) a high resin content unitape in contact with either or both sides of the second outer layer; (ii) a resin coated onto, or resin film applied to, the side of the second outer layer opposite the first outer layer; or (iii) a backside film layer placed into contact with the side of the second outer layer opposite the first outer layer. In various embodiments, a method of producing a lightweight laminate comprises disposing one or move intervening film layers between various adjacent layers prior to lamination.

In various embodiments, a method of producing a lightweight laminate comprises laminating together (a) a first outer layer; (b) at least one internal reinforcing layer; and (c) a second outer surface layer comprising a pre-preg, wherein the at least one internal reinforcing layer is disposed between first and second outer layers, and wherein the pre-preg is saturated, partially saturated and coated, or partially coated, with a wet-out resin infiltrated into the second outer layer from at least one of: (i) a high resin content unitape in contact with either or both sides of the second outer layer; (ii) a resin coated onto, or resin film applied to, the side of the second outer layer opposite the first outer layer; or (iii) a backside film layer placed into contact with the side of the second outer layer opposite the first outer layer. In various embodiments, one or more intervening film layers are disposed between various adjacent layers prior to lamination.

In various embodiments, a method of producing a lightweight laminate comprises: (a) laminating a first outer layer, at least one internal reinforcing layer, and a second outer surface layer together such that said at least one internal reinforcing layer is disposed between said first and second outer layers, and (b) wetting-out the outer exposed surface of said second outer layer with a wet-out resin. In various embodiments, the step of wetting-out the outer exposed surface of the second outer layer comprises hand or machine application of a wet-out resin, or infiltration from a high resin content unitape in contact with either or both sides of the second outer layer, or a backside film layer placed into contact with the side of the second outer layer opposite the first outer layer. In various embodiments, one or more intervening film layers are disposed between various adjacent layers prior to lamination in step (a).

In various embodiments, a method of producing a lightweight laminate comprises: (a) laminating together at least two unitape layers to form a reinforcing core layer; (b) laminating a first outer layer to one side of said reinforcing core layer; and (c) laminating a second outer layer to the other side of said reinforcing core layer, wherein said second outer layer is saturated, partially saturated and coated, or partially coated, with a wet-out resin infiltrated into the second outer layer from at least one of: (i) a high resin content unitape in contact with either or both sides of the second outer layer; (ii) a resin coated onto, or resin film applied to, the side of the second outer layer opposite the first outer layer; or (iii) a backside film layer placed into contact with the side of the second outer layer opposite the first outer layer. In various embodiments, said second outer layer comprises a pre-preg. In various embodiments, one or more intervening film layers are disposed between the at least two unitape layers prior to lamination to form the reinforcing core layer. In various embodiments, one or more intervening film layers are disposed between the first outer layer and the reinforcing core layer and/or between the second outer layer and the reinforcing core layer prior to subsequent lamination to form the lightweight laminate.

In various embodiments, these methods further comprise the step of adding a backside film to the exposed side of the second outer layer, and in some instances, utilizing the wet-out resin present within the second outer layer as a bonding agent between the backside film and the second outer layer. In various embodiments, the wet-out resin originates exclusively, substantially, or at least partly from the backside film.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure, wherein.

DETAILED DESCRIPTION OF THE INVENTION

Figure 1A:
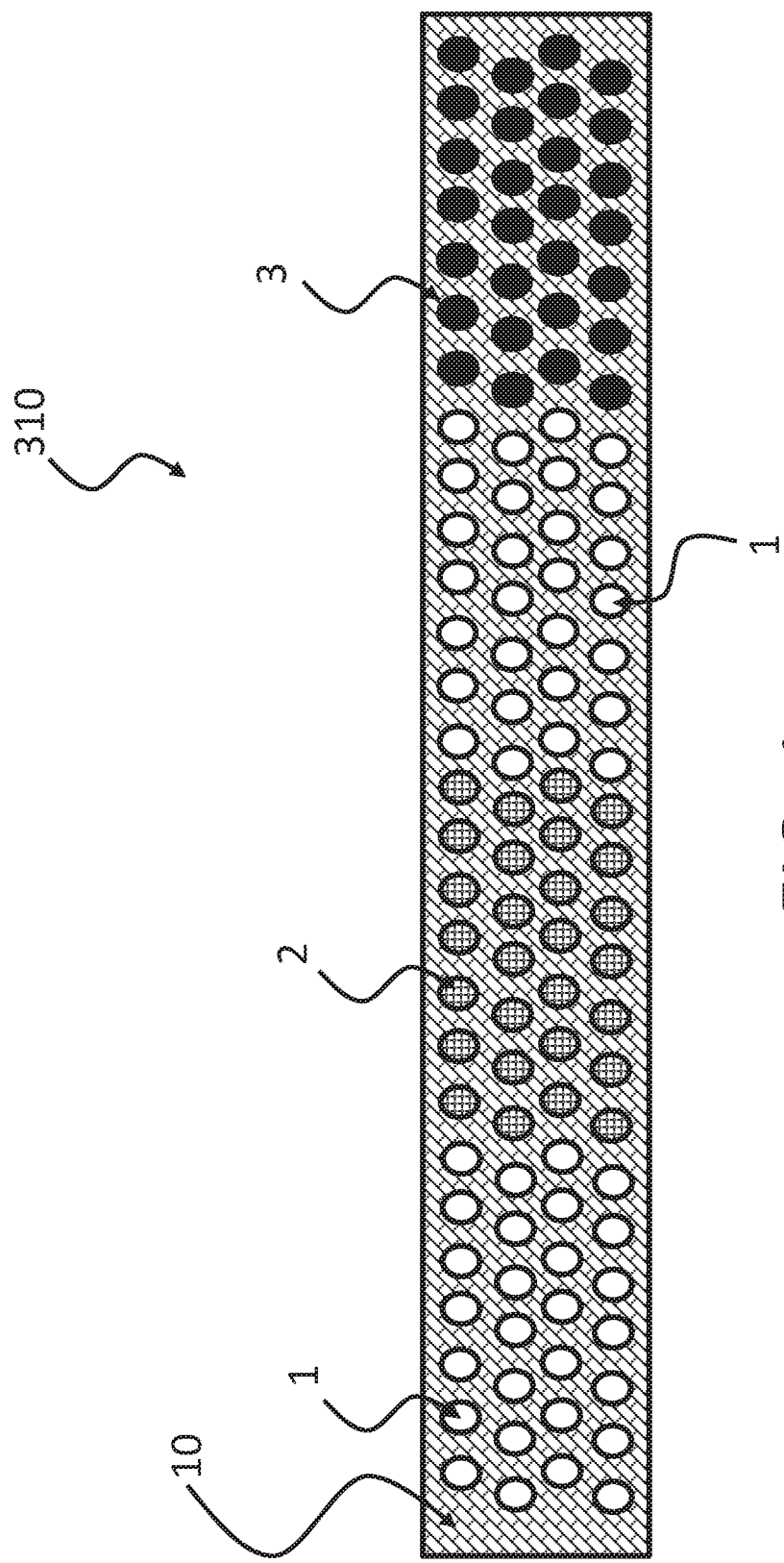
FIGS. 1a, 1b and 1c illustrate cross-sectional views of three different embodiments of unidirectional tape in accordance with the present disclosure.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

As described in more detail herein, various embodiments of the present disclosure generally comprise a lightweight laminate usable for plate-carrier vests and other articles of manufacture, said lightweight laminate comprising: (a) a first outer layer; (b) at least one internal reinforcing layer; and (c) a second outer layer, wherein said at least one internal reinforcing layer is disposed between said first and second outer layers, and wherein said second outer layer is saturated, partially saturated and coated, or partially coated with a wet-out resin. In various embodiments, said second outer layer comprises a pre-preg. Various embodiments of the lightweight laminate further comprise one or more intervening film layers disposed between various adjacent layers to assist in bonding of adjacent layers and/or to impart desired physical properties to the lightweight laminate, such as to satisfy certain product requirements for specific applications. Also as described in more detail herein, the amount (w/w %) of the wet-out resin in/on the second outer layer may be varied significantly in order to obtain desired properties in the lightweight laminate, such as to satisfy certain product requirements for specific applications.

TABLE 1 provides a brief glossary of some of the terms used in the present disclosure:

TABLE 1

| A BRIEF GLOSSARY OF TERMS AND DEFINITIONS | |
| --- | --- |
| Adhesive | A polymeric resin used to set reinforcing fibers into a sheet or to bond layers to one another in a laminate composite. Adhesives herein can be waterproof/breathable (W/B) or non-waterproof/breathable (non-W/B) resins. |
| Anisotropic | Not isotropic; having mechanical and or physical properties which vary with direction at a point in the material. |
| Areal Weight | The weight of fiber per unit area, often expressed as grams per square meter ($g/m^2$ or "gsm"). |
| Autoclave | A closed vessel for producing a pressurized environment, with or without heat, to an enclosed object, which is undergoing a chemical reaction or other operation. |
| B-stage | Generally defined herein as an intermediate stage in the curing of some resins. Sheet materials, such as comprising fibers embedded in a resin, are sometimes pre-cured to this stage, called "prepregs" in reference to the sheet material, to facilitate handling and processing prior to final curing. |
| C-Stage | Final stage in the curing/reaction of certain resins in which the material is relatively insoluble and infusible. |
| Cure | To change the properties of a polymer resin irreversibly by exposing the resin to thermal, radiation (e.g. UV, photo, flash) and/or chemical treatment(s). Curing may be accomplished by addition of curing (e.g. cross-linking) agents, with or without catalyst, and with or without heat. |
| Decitex (dtex) | Unit of the linear density of a continuous filament or yarn, equal to 1/10th of a tex or 9/10th of a denier. |
| Fiber | Refers to a filamentary material usually of long length and small diameter, the term often synonymously used with "filament" or "monofilament." |
| Filament | The smallest unit of a fiber-containing material. Filament is often synonymously used with "fiber" or "monofilament," and usually has long length and small diameter. Filaments (or individual fibers) are separable from fiber bundles, or yarn, by various processes. |
| Film | Very thin, polymeric sheet material, such as from nanometer to millimeter scale in thickness (typically 1-25 micron thick, preferably 2-17 micron thick, and more preferably about 3-10 micron thick), often comprising polymers such as polyethylene (PE), polypropylene (PP), polyurethane (PU), and the like. Films may be axially oriented or non-oriented, thermoplastic or thermosetting, and may be made e.g. by various roll-coating, extrusion and evaporative methods. Also referred to as a "film layer" and a "plastic film." In some instances, "adhesive film" is used interchangeably for a film able to adhere to one or more adjacent layers in a laminate. |
| Polymer | An organic material composed of molecules of monomers linked together. Polymers may be thermoset (curing to non-melting structure) or thermoplastic (can be re-melted and set again by cooling). |
| Prepreg | A partly cured sheet or tape material comprising unidirectional, woven, knit, or non-woven fibers in a resin partially cured to B-stage. Prepregs may be cut and supplied to a layup prior to full cure. |
| Resin | A polymeric material or mixtures of various polymers, with or without additives and solvents/carriers, which is curable or incurable, reactive or unreactive, thermoplastic or thermoset, and in an uncured, partially cured or fully cured state. The term "resin" is often synonymously used with the term "resin matrix," although the latter is often used in relation to a relatively immobile resin structure (e.g. highly viscous or cured or partially cured) having sufficient thickness to support fibers or other materials embedded therein. |
| Tow | A bundle of continuous filaments alternatively referred to as a yarn. |
| TPU | Thermoplastic polyurethane. |
| UHMWPE | Ultra-High-Molecular-Weight Polyethylene. A type of polyolefin made up of extremely long chains of polyethylene. Trade names include Dyneema ®. UHMWPE is also referred to in the industry as either high-modulus polyethylene (HMPE) or high-performance polyethylene (HPPE). The molecular weight (MW) of UHMWPE is often determined and expressed as "Intrinsic Viscosity" (IV), which is typically at least 4 dl/g and preferably at least 8 dl/g. Generally, the IV value for UHMWPE is less than about 50 dl/g, and preferably less than about 40 dl/g. |
| Unitape | Unidirectional tape (or UD tape) - flexible reinforced tapes (also referred to as sheets) having uniformly-dense arrangements of reinforcing fibers in parallel alignment and impregnated with an adhesive resin. Unitapes can comprise uncured, partially cured (e.g. to B-stage), or fully cured resin(s), and unitapes can be used as layers in the composites herein. |

TABLE 1-continued

A BRIEF GLOSSARY OF TERMS AND DEFINITIONS

Wet-out    Term used to describe the impregnation of fibers, such as structural reinforcement fibers, with a resin. A resin used for the purpose of "wet-out" or "wetting-out" is referred to herein as a "wet-out resin." A "wet-out resin" may be chemically identical or different in various ways (polymers, viscosity, dilution, carrier, etc.) to resins used for other purposes herein, such as to form unitape layers.

In various embodiments, a lightweight laminate usable for plate-carrier vests and other articles of manufacture comprises: (a) a first outer layer; (b) at least one internal reinforcing layer; and (c) a second outer layer, wherein the at least one internal reinforcing layer is disposed between the first and second outer layers; and wherein said second outer layer is saturated, partially saturated and coated, or partially coated with a wet-out resin. In various embodiments, said second outer layer comprises a pre-preg. In various embodiments, a backside film is added to the outside of the second outer layer not adjacent to the at least one internal reinforcing layer. In various embodiments, adhesion of a backside film to the second outer layer is assisted by the wet-out resin present in the second outer layer (e.g. a pre-preg). In various embodiments, one or more intervening film layers are disposed between various adjacent layers to bond adjacent layers and/or to impart various properties to the lightweight laminate.

Each of these layers within the laminate are described in detail herein below, along with various embodiments comprising additional elements or modifications to the layers. Each layer discussed appears in the order of where the layer is disposed within the lightweight laminate structure:

First Outer Layer

In various embodiments of the present disclosure, a lightweight laminate comprises a first outer layer. This first outer layer can comprise any woven cloth, felt, unidirectional ply, leather, manmade leather, foil, or nonwoven material. The first outer layer can comprise fibers or yarns of any composition, tenacity and any fiber denier. In various embodiments, an article of manufacture comprising a lightweight laminate may comprise more than one first outer layer, whereby the layers can be disposed in adjacent, partially overlapping, or fully stacked configurations. In various embodiments, a first outer layer may be commercially available, produced by the inventor, supplied by the customer, and/or it may be pre-colored and/or pre-patterned, or not colored or patterned at all. The first outer layer can be lightweight, constructed of materials that may or may not melt, and printable.

In various embodiments, the first outer layer comprises a woven fabric or coated woven fabric that functions as the outer surface of an article of manufacturer comprising the lightweight laminate disclosed herein. A purpose of adding a woven material layer to the outside of a laminate product is to provide "material properties." Such properties obtained by use of a first outer layer include, for example, abrasion resistance, texture and feel, strength, stretch resistance, tear resistance, adhesion promotion, fire retardancy, color and/or pattern. Woven fabrics finding use as the first outer layer include, but are not limited to, nylon, Nomex® (DuPont aromatic nylon), polyester, microfiber poly, cotton, polyurethane, and blends thereof (such as, for example, polyester/ polyurethane (Spandex, Lycra®) cotton/poly, nylon/cotton, nylon/poly, microfiber poly/Spandex knit, and the like). In various embodiments, the first outer layer may comprise a woven cloth having any denier fiber, any combination of fiber types, and any tenacity of fibers (e.g. high tenacity, low tenacity, or mixtures thereof).

Fibers used in the first outer layer and in any of the various layers of the lightweight laminate disclosed herein may be characterized by various physical properties, in addition to characterization by particular chemical composition. These properties, for example, relate to stretch and strength of the fibers. Tensile properties (measured at 25° C.): tensile strength (or strength), tensile modulus (or modulus) and elongation at break (or EAB) are defined and determined on multifilament yarns as specified in ASTM D885M, using a nominal gauge length of the fiber of 500 mm, a crosshead speed of 50%/min. On the basis of the measured stress-strain curve, the modulus is determined as the gradient between about 0.3 and 1% strain. For calculation of the modulus and strength, the tensile forces measured are divided by the titre, as determined by weighing 10 meters of fiber; values in GPa are calculated assuming a density of 0.97 g/cm$^3$.

Polymers, such as used for fibers, generally have an "Intrinsic Viscosity" (IV) that can be determined according to ASTM D1601-2004 (at 135° C. in decalin), the dissolution time being 16 hours, with DBPC as anti-oxidant in an amount of 2 g/l solution, by extrapolating the viscosity as measured at different concentrations to zero concentration.

Linear polymers also may be characterized by the amount of side chains present. For example, the number of side chains in a UHPE sample is determined by FTIR on a 2 mm thick compression molded film, by quantifying the absorption at 1375 cm$^{-1}$ using a calibration curve based on NMR measurements (as e.g. disclosed in EP 0269151).

In various embodiments, the first outer layer comprises 70 to 1000 denier nylon, polyamide or polyester fibers, or fibers from liquid crystal polymers such as Vectran®. In various embodiments, the first outer layer comprises 1000 denier nylon or polyamide, e.g. Cordura® Nylon. In various embodiments, the first outer layer comprises 10 to 5000 denier fibers. For example, in various embodiments, the first outer layer may comprise 10 to 5000 denier UHMWPE fibers. In various embodiments, the first outer layer comprises woven Vectran®. In various embodiments, the first outer layer may comprise fibers having tenacities from about 1.0 GPa to at least about 5.0 GPa or more, such as for example, UHMWPE fibers with tenacities >1.5 GPA, or >2.0 GPA, or >3.5 GPa, or >4.0 GPa, or >4.5 GPa.

In various embodiments, the first outer layer comprises 70 to 1000 denier woven nylon or polyester fabric, where the fabric is coated on one or both sides with polyurethane or other suitable material. In various embodiments, the first outer layer comprises woven nylon or polyester fabric coated on only one side with polyurethane or other suitable material, and the coated side is oriented adjacent to the one or more reinforcing layers in the lightweight laminate. In various embodiments, an intervening film layer, (to be disposed between the first outer layer and the one or more reinforcing layers as discussed below), replaces or augments the coating on one side of the first outer layer. For example, a polyurethane film is used between the first outer layer and the one or more internal reinforcing layers to replace or to augment a polyurethane coating on the side of the first outer layer adjacent to the reinforcing layer(s). In other embodiments, two film layers are used to surround a first outer layer, and in some cases multiple film layers are used as alternating intervening film layers between multiple first outer layers.

Lightweight laminates in accordance with the present disclosure can include one or more first outer surface layers, and can be assembled as a multilayer composite of outer surface layers, any of which may be colorized or textured, such as by using any of the various application methods set forth in U.S. Pat. Nos. 8,343,574; 8,802,189; and 9,079,218, and in U.S. Application Publication No. 2015/0266053 and incorporated herein by reference, or via any methods known in the industry. These outer surface materials may have initial coloring or patterning complementary to the various methods of infusion transfer, sublimation transfer, or roll transfer disclosed in these references, in order to obtain the desired cosmetic or visual effect. In various embodiments, an intervening film layer disposed between a first outer layer and one or more internal reinforcing layers provides a barrier to the infiltration of resin from the one or more internal reinforcing layers into the first outer layer, which in some instances can adversely affect the color and print fidelity in the first outer layer.

In various embodiments of the present disclosure, a first outer layer is configured as MultiCam®, which is the Crye Precision color/pattern recognized as standard issue camouflage. Many woven MultiCam® fabrics and nonwoven materials are available commercially. The first outer layer may comprise any other color and/or pattern required for a particular military or recreational application, such as, for example, Universal Camouflage Pattern (UCP), Universal Camouflage Pattern-delta (UCP-Delta), Airman Battle Uniform (ABU), Navy Working Uniform (NWU), Disruptive Overwhite Snow digital camouflage, and the like, or any other made-up color and/or pattern resembling the various existing patterns of camouflage, or any other color and/or pattern that may find use in military or recreational articles.

In various embodiments, the first outer layer of a lightweight laminate is added at a later time to a sub-laminate comprising: (a) at least one internal reinforcing layer; and, (b) a second outer layer bonded to the at least one internal reinforcing layer. In various embodiments, the second outer layer comprises a saturated or partially saturated and coated, or partially coated, pre-preg layer, wet-out with a wet-out resin. In various embodiments, one or more intervening film layers may be disposed between the various layers of the sub-laminate. This later application of a first outer layer to a sub-laminate creates a lightweight laminate having at least one reinforcing layer disposed between the first and second outer layers. In various embodiments, a contract or third-party manufacturer, a customer, a marketer, a finisher, or some other entity, takes quantities of the said sub-laminate (e.g. as roll-goods) and runs smaller, more cost-effective batch runs of finished product(s) desired by some entity, by laminating the first outer layer onto said sub-laminate as needed for a particular run. In various embodiments, the first outer layer at the entity performing the final lamination is already printed and patterned appropriately for the entity's desired product.

As discussed herein below, the first outer layer, along with most if not all of the other components of the lightweight laminate, may be treated or coated with various additives to promote fire retardancy and/or self-extinguishing properties, if the first outer layer chosen requires such properties or augmentation of these existing properties (such as in the case of Nomex® woven fabrics). Further, the first outer layer, along with most if not all of the other components of the lightweight laminate, may be treated with various additives to promote antimicrobial properties.

Internal Reinforcing Layers

In various embodiments of the present disclosure, a lightweight laminate comprises at least one internal reinforcing layer disposed between the first outer layer discussed above and the second outer layer disclosed herein below, with optional film layers intervening between. The internal reinforcing layer may be directionally reinforced, such as, for example, by incorporation of strengthening monofilaments disposed in a single direction. In various embodiments, at least two, at least four, and at least six internal reinforcing layers are stacked together and bonded to one another. In various embodiments, the at least one internal reinforcing layer is bonded both to the first and second outer layers, and in the case of multiple internal reinforcing layers, a stack of directionally oriented internal reinforcing layers is bonded to both the first and second outer layers. In various embodiments, one or more intervening film layers are disposed between layers at any one or more locations in the lightweight laminate, such as, between first outer layer and an adjacent internal reinforcing layer, between various internal reinforcing layers when more than one is present, and between second outer layer and an adjacent internal reinforcing layer.

In various embodiments, an internal reinforcing layer comprises a unitape layer. Compared to traditional woven fabrics of the same weight, unitape reinforcing layers are significantly thinner, flatter, stronger, and are more tear resistant when comprising cross-plied fiber arrangements. In various embodiments, at least one unitape forms the reinforcing inner core of a lightweight laminate, disposed between first and second outer layers. In various embodiments, one or more intervening film layers are disposed in any combination between unitape layers in a reinforcing core layer. In various embodiments, intervening film layers may alternate with unitape layers, or be disposed in other arrangements (such as skipping particular adjacent layer locations).

A unidirectional tape is a fiber-reinforced layer comprising thinly spread parallel monofilaments coated by a resin. The resins include, but are not limited to, benzoxazine resin, cyanate ester resin, urethane resin, acrylic resin, epoxy resin, vinyl ester resin, polyester resin, phenolic resin, other thermoplastic and thermoset materials, and mixtures thereof, any of which may be modified to improve barrier properties of the resin and/or to improve water vapor diffusion and transport through the resin. In various embodiments, resins used in the unitape layers herein include: (1) flexible thermoplastic polyester or urethane resin; (2) rigid thermoset resin; and (3) cross-linked thermoset elastomeric resin. The thermoset elastomer, made from reacting isocyanates with polyols after wet-out of the unidirectional fibers allows for complete penetration of resin around each filament because of the thin viscosity of the liquid premix prior to chemical reaction. In various embodiments, the thermoset elastomeric resin is chosen for the unitape internal reinforcing layers because of the strength of the resulting bonding between the fibers and the resin, preventing fiber pull-out upon impact of the lightweight laminate with a projectile.

In various embodiments, resin may be any type of self-curing, curable, or non-curing resin. When disposed within a laminate, each unitape layer is inherently directionally oriented in a dedicated direction due to the single direction of the set of parallel fibers in the unitape, which limits stretch and provides strength in a chosen direction. In various embodiments, a "two-direction" unitape stack of layers comprises a first unitape layer disposed at a chosen reference direction, referred to as "45°," (the 0° direction being the warp direction of the first outer layer of the lightweight laminate if the first outer layer is woven, e.g. satin weave), and a second unitape layer laid thereon disposed at approximately a 135° orientation. In this way the parallel fiber direction in the second unitape layer is 90° to the parallel fiber direction in the first unitape layer. Another way of articulating this is to say that the two parallel fiber directions are disposed 90° relative to one another, or that two layers of unitape are laminated in a substantially 45°/135° relative orientation of their fibers versus the warp direction of the first outer layer or second outer layer.

In the same manner, various one-direction, two-direction, three-direction, and four-direction combinations, along with any other unitape directional combinations in multiple unitape stacks, create a reinforcing core within the lightweight laminate, giving the lightweight laminate a desired directional or non-directional (i.e. uniform) reinforcement. One or more intervening film layers may be disposed between the oriented unitape layers. For example, in various embodiments, four layers of unitape may be laminated in a substantially 0°/+45°/+90°/+135° relative orientation of their fibers to create an overall cross-hatched pattern of fibers and an overall multi-directional, quasi-isotropic reinforcement to the lightweight laminate, with optional intervening film layers disposed between various untape layers.

In various embodiments, an intervening film layer is disposed between each and every unitape layer, creating an alternating stack of UD-film layers within the lightweight laminate. For example, polyethylene (PE) or polyethylene naphthalene (PEN) film (e.g. 0.5 mil, or 12.7 micron thickness) with high modulus is used between UD plies wherein the intervening film layers improve adhesion and shear properties, and act as "strain isolators," isolating the two unidirectional ply layers disposed on either side of the film. Film between UD plies also offers additional fiber stabilization and prevention of fiber pull-out.

In various embodiments, a unitape reinforcing layer comprises fibers such as UHMWPE (e.g., Dyneema®), liquid crystalline polymer such as Vectran®, aramid, polyester, nylon, glass, carbon, metal, or other fibers, embedded in a resin and disposed in a single direction. In various embodiments, a unitape reinforcing layer comprises fibers having tenacities from about 1.0 GPa to at least about 5.0 GPa or more, such as for example, UHMWPE fibers with tenacities >1.5 GPA, or >2.0 GPA, or >3.5 GPa, or >4.0 GPa, or >4.5 GPa.

A unitape layer may comprise only one fiber type (e.g. just UHMWPE) or more than one fiber type. With multiple fiber types within the same unitape sheet, each fiber types can be disposed into adjacent bands (e.g. alternating the fiber types into some type of pattern), (see e.g. FIG. 1a, discussed below), or disposed randomly, (see e.g. FIG. 1b, discussed below). Depending on the finished articles of manufacture, (e.g. military gear), it may be necessary to choose a high melt temperature for the fibers in each unitape reinforcing layer. For example, Vectran® may be chosen instead of UHMWPE because Vectran® melts above 290° F. In various embodiments, fibers (e.g. UHMWPE, Dyneema®) may be surface treated to remove surface contaminants and/or defects prior to embedding in resin. Such treatment can include corona, plasma, flame, or other surface treatment methods. Fiber treatment also improves the wetting of fibers with resins (reduced contact angle of liquids in contact with the fibers) and can be used to create a surface architecture (e.g. etching), all of which is used to improve bonding between the fibers and the resin and to prevent fiber pull-out during impact with a projectile.

In various embodiments, unitape reinforcing layers comprise fibers of any denier, such as for example, ranging from less than 1 denier fiber to up to 2000 denier or greater. Such fibers may be embedded into resin such that the resin content in the unitape is from about 10% by weight up to 90% by weight or even greater, based on the total weight of the unitape. Unitapes that find use in the lightweight laminates of the present disclosure can have fiber areal density of from less than about 1 $g/m^2$ up to about 200 $g/m^2$ or more, for ply weights ranging from less than about 1 $g/m^2$ up to about 200 $g/m^2$ or more. In various embodiments, resin content may range from about 30% by weight to about 70% by weight, based on the total weight of the unitape ply. In various embodiments, fiber areal density may be from about 5 to about 30 $g/m^2$, with ply weights from about 9 to about 60 $g/m^2$.

With reference now to FIG. 1a, an embodiment of a unidirectional tape 310, usable as an internal reinforcing layer within a lightweight laminate of the present disclosure, is illustrated in cross-section. In this unitape, three different fibers types are present, namely, UHMWPE (e.g. Dyneema®) noted as "1", aramid, noted as "2", and carbon, noted as "3". In this embodiment and as seen in the cross-sectional illustration, the fiber types are arranged in adjacent bands, wherein UHMWPE fibers 1 are grouped adjacent to groups of aramid 2 and carbon fibers 3, with all the fibers embedded in a resin matrix noted as "10."

Figure 1B:
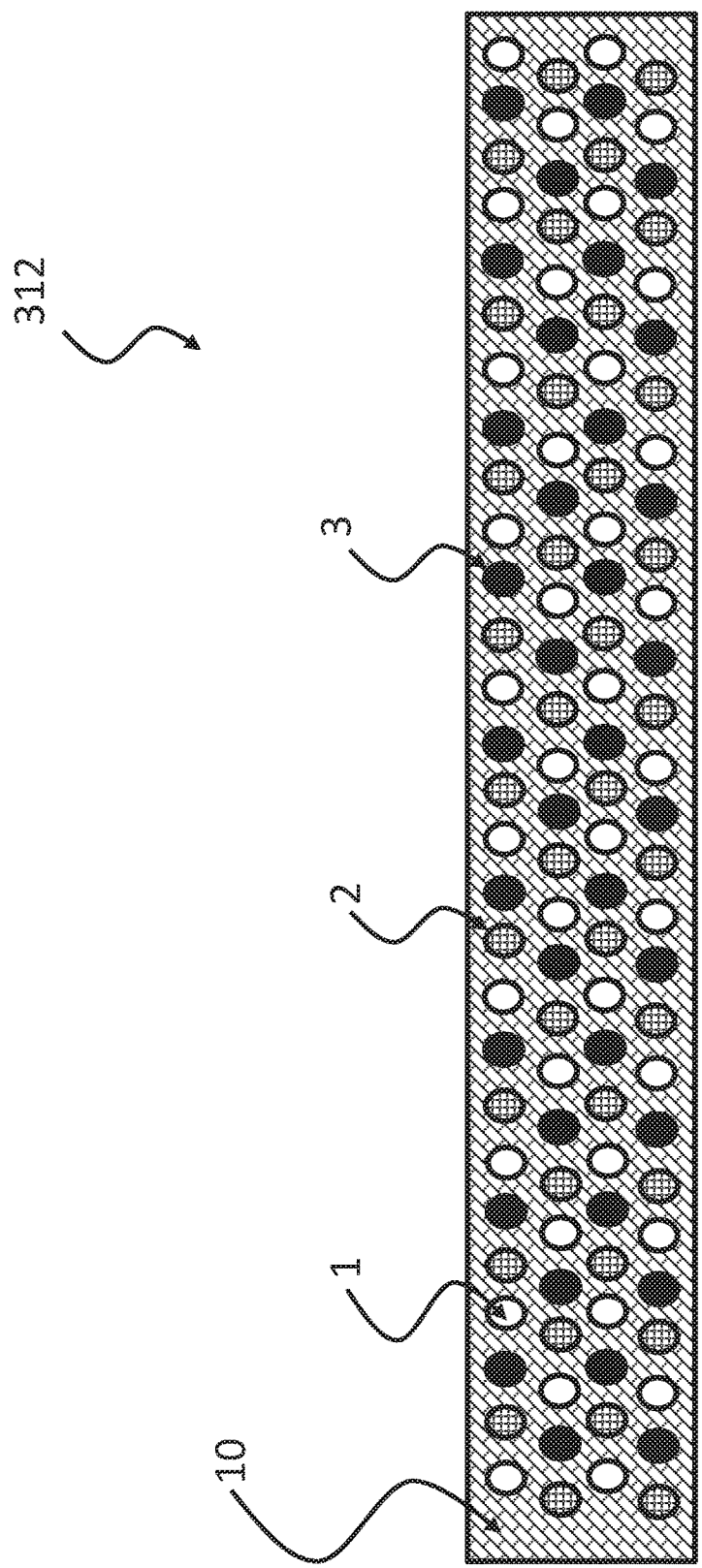

With reference now to FIG. 1b, another embodiment of a unidirectional tape 312, also usable as an internal reinforcing layer within a lightweight laminate of the present disclosure, is illustrated in cross-section. In this unitape, the same three different fibers types are present as in the embodiment depicted in FIG. 1a, namely, UHMWPE (e.g. or Dyneema®; noted as "1"), aramid noted as "2", and carbon noted as "3". However in this unitape embodiment, and as can be seen in the cross-sectional illustration, the fiber types are arranged randomly within the resin matrix "10".

Figure 1C:
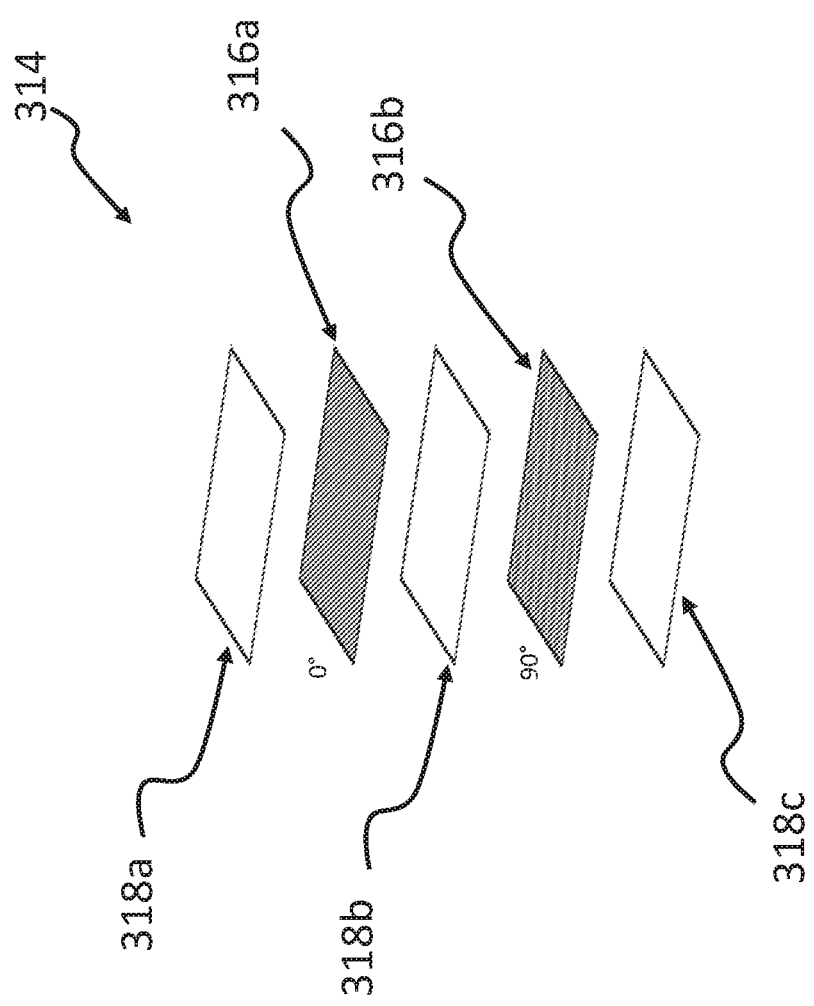

With reference now to FIG. 1c, an embodiment of an internal reinforcing core layer 314 comprising cross-plied unitape layers 316a and 316b and intervening film layers 318a, 318b and 318c is depicted. Although depicted with only two cross-plied UD layers (0°/90° orientation) and three layers of film, (e.g. 12.7 micron PE film), such a reinforcing structure can be expanded to include any number of UD ply layers in any orientation of fiber direction and any number of intervening film layers. Film layers 318a and 318c depicted in FIG. 1c can participate in bonding of first and second outer layers to either side of the internal reinforcing core 314. In this way, the film layer 318a may become an intervening film layer disposed between a first outer layer and an adjacent internal reinforcing layer 316a, and film layer 318c may become an intervening film layer disposed between a second outer layer and an adjacent internal reinforcing layer 316b. In various embodiments, the film layers 318a, 318b and 318c comprise low density polyethylene (LDPE) and the film layers may melt and substantially flow into adjacent layers during a lamination process. In various embodiments, film layers 318a, 318b and 318c comprise the same material or different materials of construction. For example, in various embodiments, film layer 318b may be chosen to melt and infuse into adjacent layers during lamination (e.g. LDPE) whereas film layers 318a and 318b may be chosen such that they do not melt during lamination (e.g. thermoset PU), and remain relatively intact in the finished lightweight lamination to affect slippage of each of the first and second outer layers with the internal reinforcing core layer 314.

In various embodiments, internal reinforcing layers within lightweight laminates of the present disclosure comprise at least one unitape having monofilaments therein, all of such monofilaments lying in a predetermined direction within the unitape, wherein such monofilaments have diameters less than about 60 microns and wherein spacing between individual monofilaments within an adjoining strengthening group of monofilaments is within a gap distance in the range between abutting and/or stacked monofilaments up to about 300 times the monofilament major diameter. In various embodiments, abutted and/or stacked monofilaments form a reinforcing layer that is one or multiple monofilament layers thick, depending on strength and modulus considerations of the lightweight laminate design. In various embodiments, abutting and/or stacked monofilaments produce a substantially flat reinforcing layer that may be more appropriate for certain finished articles of manufacture incorporating the lightweight laminate.

In various embodiments, monofilaments disposed within unitape reinforcing layers are extruded. In various embodiments, monofilaments disposed within unitape reinforcing layers are pultruded.

In various embodiments, at least two unitapes disposed internally within a lightweight laminate include larger areas without monofilaments therein, and wherein such larger areas comprise laminar overlays comprising smaller areas without monofilaments. Such smaller areas can comprise user-planned arrangements, such as to provide different flexibility between various regions of a lightweight laminate material.

In various embodiments, the internal core of a lightweight laminate comprises a laminated stack of unitapes wherein a combination of the different predetermined directions of at least two of the unitapes is user-selected to achieve laminate properties having planned directional rigidity/flexibility.

In various embodiments, a lightweight laminate material comprises multiple laminate segments attached along peripheral joints, such as for example to provide a bendable joint in a military vest. For example, a lightweight laminate material may comprise at least one laminate segment attached along peripheral joints with at least one non-laminate segment. In various embodiments, a lightweight laminate material comprises multiple laminate segments attached along area joints.

In various embodiments, a lightweight laminate comprises at least one laminate segment attached along area joints with at least one unitape segment. Additionally, in various embodiments, a lightweight laminate comprises at least one laminate segment attached along area joints with at least one monofilament segment. Also, in various embodiments, a lightweight laminate further comprises at least one rigid element.

For example, to illustrate the utility of the above design options, portions of a lightweight laminate can be designed to have greater flexibility for use within the side region of a piece of upper body apparel (e.g. within the armpit), whereas less flexible arrangements may be designed for use on the front and rear panels of the upper body apparel.

As discussed herein below, internal reinforcing layers, such as for example, unitape layers (sheets), along with most if not all of the other components of the lightweight laminate, may be treated with various additives to promote fire retardancy and/or self-extinguishing properties. Further, internal reinforcing layers, along with most if not all of the other components of the lightweight laminate, may be treated with various additives to promote antimicrobial properties.

Second Outer Layer

In various embodiments, a lightweight laminate comprises a second outer layer laminated onto the first outer layer discussed above. In various embodiments, the lightweight laminate further comprises at least one internal reinforcing layer disposed between first and second outer layers. In various embodiments, one or more intervening film layers are disposed between any two adjacent layers.

In various embodiments, a lightweight laminate comprises a second outer layer laminated onto the other components discussed above such that said first outer layer and the second outer layer sandwich the one or more reinforcement layers. In this way, a lightweight laminate comprises two outer surface layers and an internal reinforcing core for structure.

In various embodiments, a lightweight laminate comprises an internal reinforcing core layer disposed between first and second outer layers, wherein the internal reinforcing core layer further comprises two or more unitape layers.

In various embodiments, a second outer layer is chosen from the group consisting of woven cloth, (non-coated, coated, substantially dry, and/or previously impregnated to any degree with a resin), leather, manmade leather, foil, knit, nonwoven such as felt, spun-bond, air-laid, or one or more unidirectional ply layers, film, and membrane. In various embodiments, a second outer layer is surface treated prior to, or after incorporation into a lightweight laminate. For example, in various embodiments, a second outer layer is corona, plasma or flame treated.

In various embodiments, a lightweight laminate comprises a second outer layer that is saturated, partially saturated and coated, or partially coated with a wet-out resin. In various embodiments, a lightweight laminate comprises a second outer layer comprising a pre-preg. In various embodiments, wet-out resin is infiltrated into the second outer layer from at least one of: (i) a high resin content unitape in contact with either or both sides of the second outer layer; (ii) a resin coated onto, or resin film applied to, the second outer layer; or (iii) a backside film layer (having resin) placed into contact with the side of the second outer layer opposite the first outer layer.

In various embodiments, the second outer layer is applied to the first outer layer, an internal reinforcing layer or reinforcing core layer in a substantially dry state, (i.e. no prior impregnation of the second outer layer with any resin). In various embodiments, the second outer layer comprises substantially dry UHMWPE (e.g. Dyneema®) woven fabric, which is, at a later time, wet-out with a wet-out resin infiltrated into the dry UHMWPE (e.g. Dyneema®) woven from at least one of: (i) a high resin content unitape in contact with either or both sides of the second outer layer; (ii) a resin coated onto, or resin film applied to, the second outer layer; or (iii) a backside film layer (having resin) placed into contact with the side of the second outer layer opposite the first outer layer.

In various embodiments, the second outer layer is pre-impregnated with a resin prior to contact with any other layers in a layup. In various embodiments, the pre-impregnated resin is chemically identical to a later-applied wet-out resin, and/or chemically identical to resin used in adjacent unitape layers. For example, in various embodiments, the second outer layer comprises a woven material impregnated with 10-90% (w/w %) resin. In various embodiments, the second outer layer comprises woven Dyneema® pre-impregnated with about 30-50% resin based on the total weight of the second outer layer. In various embodiments, a second outer layer comprises 70-1000 denier woven Dyneema fabric, such as for example, in square weave, pre-impregnated with about 40% resin (by weight based on the total weight of the Dyneema® fabric). In various embodiments, a second outer layer comprises 375 denier woven Dyneema® fabric, 32×32 fibers/square inch, square weave, 103 g/m² FAW, pre-impregnated with 40% by weight resin. Such a fabric has a total areal weight of about 175 g/m².

In various embodiments, the second outer layer can be laminated to the one or more internal reinforcing layers with or without a bonding agent. In various embodiments, the second outer layer can be applied to the first outer layer or to the one or more internal reinforcing layers in a dry state (i.e. absent resin). In various embodiments, the dry second outer layer will be infiltrated at least partially with wet-out resin from the first outer layer or the one or more internal reinforcing layers, (e.g. high resin content unitape layers). The second outer layer can be laminated to the first outer layer or to the internal reinforcing layers with the aid of a wet-out resin, discussed herein below. In other embodiments, the second outer layer can be laminated to the various internal reinforcing layers with an adhesive, and/or may be laminated to the outermost internal reinforcing layer in the same lamination process used to bond together multiple reinforcing layers into a reinforcing core. In various embodiments, an intervening film layer is disposed between the second outer layer and the one or more internal reinforcing layers to provide bonding of the second outer layer to the adjacent reinforcing layer, and/or to modify the interaction between layers and one or more of the properties of the finished lightweight laminate. For example, in various embodiments, an intervening film layer comprising LDPE is disposed between a second outer layer and an internal reinforcing layer, whereby during lamination the intervening film melts and bonds the layers together. In various other embodiments, the composition of the intervening film is chosen such that all, or part, of the intervening film remains between the second outer layer and the adjacent reinforcing layer after lamination.

In various embodiments, a second outer layer of a lightweight laminate comprises woven cloth further comprising a weave of UHMWPE (e.g. Dyneema®), liquid crystalline polymer (e.g. Vectran®), aramid (e.g. Kevlar® or Nomex®), nylon, cotton, polyester, rayon, or any combinations thereof, whereby any of these fibers may be of any denier and tenacity. In various embodiments, the second outer layer comprises a weave of 10 denier to 5000 denier UHMWPE fibers. In various embodiments, the second outer layer comprises a weave of 100 denier to 2000 denier UHMWPE fibers. In various embodiments, the second outer layer comprises at least one of high tenacity fibers and low tenacity fibers, such as fibers having tenacities from 1 to 5 GPa or more. For example, in various embodiments, the second outer layer comprises UHMWPE fibers having tenacity of >1.5 GPa, >2.0 GPa, >3.5 GPa, >4.0 GPa, or >4.5GPa. In various embodiments, the second outer layer comprises UHMWPE (e.g. Dyneema®) woven fabric, such as manufactured by gel spinning technology. A purpose of adding a woven material layer to the outside of a laminate product is to provide "material properties" to an outside surface. Such properties obtained by use of a second outer layer include, for example, tear resistance, strength, stretch resistance, abrasion resistance, texture and feel, color and/or pattern.

In various embodiments, a second outer layer of a lightweight laminate comprises any type of nonwoven, such as a staple nonwoven, wet-laid nonwoven, air-laid nonwoven, or spun-bond nonwoven, incorporating any synthetic or natural material such as polyester, polypropylene, polycarbonate, cotton, or paper.

In various embodiments, the first and second outer layers are bonded together absent internal reinforcing layers, or disposed on either side of an internal reinforcing layer or on either side of a stacked group of multiple reinforcing layers, the latter referred to herein as an "internal reinforcing core layer." In various embodiments, an internal reinforcing core layer comprises multiple unitape layers disposed in predetermined directions, and optionally further comprising one or more intervening film layers disposed between any or all of the unitape layers.

As discussed herein below, the second outer layer, along with most if not all of the other components of the lightweight laminate, may be treated with various additives to promote fire retardancy and/or self-extinguishing properties. Further, the second outer layer, along with most if not all of the other components of the lightweight laminate, may be treated with various additives to promote antimicrobial properties.

Wet-out Resin

In various embodiments of the present disclosure, the second outer layer further comprises a wet-out resin disposed within and/or on the second outer layer. In various embodiments, the second outer layer is saturated, partially saturated and coated, or partially coated with a wet-out resin. In various embodiments, a wet-out resin is forced into the second outer layer material such that the resulting second outer layer is saturated, partially saturated and coated, or partially coated. In various embodiments, the second outer layer can be wet-out with a wet-out resin anytime in the production of the lightweight laminate. Wet-out resin may infiltrate into the second outer layer (e.g. by capillary action) and/or may be pushed into the interstices of the second outer layer with pressure from nip rollers, a belt press, bagged systems, or other processes.

In various embodiments, the wet-out resin infiltrates into the second outer layer from at least one of: (i) a high resin content unitape in contact with either or both sides of the second outer layer; (ii) a resin coated onto, or resin film applied to, the side of the second outer layer opposite the first outer layer; or (iii) a backside film layer (having resin) placed into contact with the side of the second outer layer opposite the first outer layer.

In various embodiments, the wet-out resin originates exclusively, substantially, or at least partly from a backside film applied to the second outer layer.

In various embodiments, the wet-out resin infiltrates into the second outer layer from at least one of: (i) a high resin content unitape in contact with either or both sides of the second outer layer; (ii) a resin coated onto, or resin film applied to, the side of the second outer layer opposite the at least one internal reinforcing layer; or (iii) a backside film layer (having resin) in contact with the side of the second outer layer opposite the at least one internal reinforcing layer. In various embodiments, the wet-out resin originates exclusively, substantially, or at least partly from a backside film applied to the second outer layer. The amount of wet-out resin infiltrating into the second outer layer from at least one of these sources is dependent upon a number of variables, such as, but not limited to, the nature of the second outer layer e.g. the fiber type and fiber arrangement in the second outer layer, whether the second outer layer is surface treated (e.g. corona), to what degree, if any, the second outer layer is pre-impregnated with a resin, whether any applied pressure aids in pressing wet-out resin into the interstices of the second outer layer, (e.g. use of nip rollers or other processes), the type of wet-out resin and the temperature and viscosity of the wet-out resin.

In various embodiments, the second outer layer of a lightweight laminate comprises a pre-preg comprising the wet-out resin. That is, in various embodiments, the second outer layer is a pre-impregnated fabric comprising both a fabric and a wet-out resin therein.

In various embodiments, a wet-out resin is applied to one or both sides of the second outer layer, or forced into the fabric such that the second outer layer of the lightweight laminate is saturated, partially saturated and coated, or partially coated with the wet-out resin.

In various other embodiments, a wet-out resin is applied to the outside of the second outer layer, that is, to the side of the second outer layer not in contact with the one or more internal reinforcement layers.

In various embodiments, the wet-out resin within the second outer layer impregnates and seals fibers within the second outer layer such that pullout, fray, and comb-out of fibers is mitigated, particularly when the finished lightweight laminate is cut (by a laser, or die for example) to attach hardware or other elements. Further, with proper choice of wet-out resin used for the second outer layer, and overall choice of materials in each of the layers of the laminate, laser-cutting of the lightweight laminate can be fine-tuned such that the cut edges of the laminate are simultaneously "cauterized" as they form during the laser-cutting operation.

In various embodiments, the wet-out resin is used within the second outer layer at up to about 70% by weight or more, based on the total weight of the second outer layer and wet-out resin combined. In various embodiments, the wet-out resin comprises from about 30% to about 50% by weight of the total weight of the second outer layer and wet-out resin combined. In various embodiments, the wet-out resin comprises about 40% by weight of the total weight of the second outer layer and wet-out resin combined. In various embodiments, wet-out resin at levels of about 30-50% by weight may provide for a deformable structure, and weak bonding of the wet-out resin to the fibers can provide a fiber pull-out capability that aids deformation of the lightweight laminate upon projectile impact. In various embodiments, the total resin (w/w %) in the second outer layer comprises the combination of resin from a pre-impregnation of the second outer layer and a later wet-out with wet-out resin.

In various embodiments, the wet-out resin comprises much lesser amounts, from about 1% to about 20% by weight of the total weight of the second outer layer and wet-out resin combined. In various embodiments, the wet-out resin comprises from about 1% to about 10% by weight of the total weight of the second outer layer and wet-out resin combined. In various embodiments, the wet-out resin comprises from about 5% to about 10% by weight of the total weight of the second outer layer and wet-out resin combined. In various embodiments, the wet-out resin comprises about 9% by weight of the total weight of the second outer layer and wet-out resin combined. In various embodiments, lesser amounts of relatively brittle wet-out resin promote "rapid de-lamination" of the lightweight laminate upon impact with a projectile.

In various embodiments, about 1-10 wt. % of wet-out resin infiltrates into the second outer layer from at least one of: (i) a high-resin content unitape layer in contact with the second outer layer; (ii) a wet-out resin, or resin film applied to the second outer layer; or (iii) a backside film (with resin) in contact with the second outer layer.

Not wishing to be bound by any particular theory it is believed that wet-out resin not only impregnates and stabilizes both the individual monofilaments and the bundles of monofilaments (i.e., the fibers) within the second outer layer, it also fills in all the interstices in the weave (e.g. the "windows" bounded by the crossings points of the fibers). With this in mind, a saturation point is expected to exist, consistent with having reached the total amount of wet-out resin required to substantially fill many of the available voids in the second outer layer. It is believed that additional wet-out beyond filling most of the voids creates unnecessary stiffness in the lightweight laminate product, along with unnecessary cost, without adding any additional resistance to fiber pullout and comb-out.

Unlike "rubberizing" used in the market to waterproof apparel and gear, a wet-out resin gets into the fibers to seal out moisture. Rubberizing typically only coats a fabric with a rubberized layer without significant impregnation of the voids therein.

In various embodiments, resins can include, but are not limited to, benzoxazine resin, cyanate ester resin, urethane resin, acrylate resin, epoxy resin, vinyl ester resin, polyester resin, phenolic resin, and mixtures thereof. Other resins presently known or those developed in the future can find use as the wet-out resin herein. In various embodiments, the wet-out resin is chosen from the group consisting of thermoset polymers, thermoplastic polymers, and mixtures thereof. In various embodiments, the wet-out resin can be later modified to change or improve, or increase or decrease, ability to diffuse various gaseous materials, such as water vapor. Such modifications to the resin can include the processes known in the industry for manufacturing semi-permeable membranes (e.g. those used in reverse osmosis systems and for desalination).

Choice of resin can be influenced by the type of fibers present within the second outer layer and whether the second layer comprises woven, knitted, stitched, or bonded fabric, amongst other considerations. Any of the resins used for wet-out of the second outer layer may further comprise inorganic filler such as, for example, silica sand, fumed silica or clay. As such, the resin chosen for wet-out can have any viscosity when in the liquid state as needed, such as from "water-thin" up to hundreds of thousands of centipoise (resembling spackle). Such modification in viscosity can allow for open bath wet-out or hand lay-up, or any other method of application of the resin.

In various embodiments, more than one type of wet-out resin is used for application to the second outer layer. For example, a wet-out resin with relatively low viscosity can be applied first in order to impregnate the voids and a relatively heavier wet-out resin applied next to form an overall sealing layer.

The wet-out resin can affect the properties of the second outer layer by altering the interaction between adjacent fibers in the second outer layer. For example, filling a void between adjacent fibers with the wet-out resin allows shear transfer between fibers. Further, there can be load transfer through the laminate structure. In various embodiments, a projectile causes rapid de-lamination of the lightweight laminate, rather than deformation of the laminate, such as made possible by fiber pull-out.

As discussed herein below, the wet-out resin, along with most if not all of the other components of the lightweight laminate, may be treated with additives to promote fire retardancy and/or self-extinguishing properties and/or to mitigate microbial growth.

Backside Film

In various embodiments of the present disclosure, the lightweight laminate may further comprise a backside film applied to the second outer layer, opposite the internal reinforcing layers or opposite the first outer layer (when internal reinforcing layers are absent). Since the second outer layer is impregnated to at least some degree by a wet-out resin (and in some embodiments comprises a prepreg comprising a wet-out resin), the backside film may be bonded to the second outer layer by way of the wet-out resin. In various embodiments, the backside film supplies all or at least part of the wet-out resin used to wet-out the second outer layer of the lightweight laminate.

In various embodiments, the second outer layer may be wet-out with a wet-out resin on one or both sides, and then the backside film applied to the second outer layer before the wet-out resin self-cures (e.g. by chemical reaction) or is cured (e.g. by heat, light, etc.). In this way, the wet-out resin is utilized as the adhesive to bond the backside film to the second outer layer, in addition to its primary function of impregnating the voids between monofilaments, fibers, and weave windows present in the second outer layer.

In various embodiments, a backside film applied to a lightweight laminate is the side of the lightweight laminate placed into contact with a person wearing a vest or other apparel made from the lightweight laminate.

In various embodiments, the backside film is chosen from unidirectional plies, films, nonwovens, felts, woven cloths, coated woven cloth, leather, foil, knits, manmade leather, weldable thermoplastic membranes, viscoelastic thermoplastic polymers, thermoset polymers, waterproof/breathable (W/B) membranes, and fabric scrims.

In various embodiments, the backside film comprises a viscoelastic polymer. A backside film made from a viscoelastic material provides spring-back to the laminate and a certain degree of waterproofing.

In various embodiments, the backside film comprises Nomex®.

In various embodiments of the present disclosure, the backside film comprises a waterproof/breathable (W/B) membrane. For example, a W/B membrane may have pore size such that water-vapor can transfer through the material, but water in the liquid state cannot. Such membranes may comprise expanded polytetrafluoroethylene (ePTFE), polyurethane, or polyester, and the like. As non-limiting examples, the W/B membrane may comprise eVent® (from General Electric), Gor-Tex® (ePTFE from Gore) MemBrain® (polyurethane membrane from Marmot Mountain, LLC), or SympaTex® Membrane (polyester membrane from Sympatex Technologies).

Intervening Film Layers

In various embodiments, a lightweight laminate in accordance with the present disclosure may comprise one or more intervening film layers disposed between any of the layers of the lightweight laminate. Intervening film layers may comprise, for example, PE, LDPE, linear low density PE (LLDPE), high density PE (HDPE), polypropylene (PP), ethylene vinyl acetate (EVA), metallocine, UHMWPE, polyethylene naphthalene (PEN), polycarbonate, polyethylene terephthalate (PET), other polyester films, (e.g. Melinex®, Mylar®, and Teijin® Tetoron®), polytetrafluoroethylene (Teflon®), and PU, and other polymers. Intervening film layers may have any Melt Index (MI) or other physical properties as needed. For example, film layers may need to melt quickly under lamination temperatures, converting to a liquid having relatively low viscosity so as to be able to flow into adjacent layers. In various embodiments, a film may be chosen such that it partially melts, fully melts, or does not melt at all under lamination temperatures.

In various embodiments, one or more intervening film layers comprise relatively thin polymeric sheet material. In various embodiments, films are about 0.1-5 mil thick (i.e. about 2.5-127 micron thick). In various embodiments, films are 1-25 micron thick, preferably 2-17 micron thick, and more preferably about 3-10 micron thick. In various embodiments, films comprise LDPE, PU, PP or PET and have thicknesses of about 0.1-1.0 mil. In various embodiments, films comprise 0.1-5 mil thick PU, or 0.1-5 mil thick polyester. In various embodiments, films are 0.5 mil, or 1 mil, or 1.8 mil, or 2 mil thick PU or polyester. In various embodiments, films are 0.5 or 1.0 mil thick, LDPE, melt under lamination conditions, (e.g. at temperatures greater than about 135° C.), and flow into adjacent layers such as to bond layers disposed on either side of the film.

In various embodiments, one or more intervening film layers may or may not be perceivable after lamination processes. For example, some residual intervening film layer may be found still disposed between adjacent layers after a lamination operation, or no film material at all may be detected, or the film layer may be left relatively intact and substantially unchanged after lamination. These variations allow for various degrees of bonding of adjacent layers by an intervening film layer, and/or modification of the interaction between adjacent layers around the film after lamination (e.g. promoting a slippage between adjacent layers aided by the remaining or unchanged intervening film). As discussed above, the one or more intervening film layers can be selected to have different physical properties, such as MI.

In various embodiments, one or more intervening film layers further comprise additives such as, for example, thermal stabilizers, antistatic agents and slippage/friction agents. One or more intervening film layers used within a lightweight laminate in accordance to the present disclosure may be axially oriented, bi-axially oriented, non-oriented, extruded, annealed, crystalline, amorphous, and/or thermoplastic or thermosetting. An intervening film may operate as an adhesive between adjacent layers, (as discussed above for bonding of adjacent layers), and in these instances may be referred to as an "adhesive film" layer. In various embodiments, an intervening film comprises a thermoset or other thermally stable polymer, and is chosen such that it remains substantially unchanged after any processes involving heat and/or pressure. In various embodiments, intervening films are used to reduce friction between adjacent layers such that the layers may, at least to some degree, slip past one another. In various embodiments, slippage between adjacent layers, such as aided by a friction-reducing intervening film, increases flexibility of the lightweight laminate and articles of manufacture produced therefrom.

In various embodiments, a film provides a wet-out resin, (and in some instances may be referred to herein as a "resin film"). In various embodiments, a resin film melts under lamination conditions and at least partially flows into adjacent layers, such as a second outer layer. In various embodiments, a resin film layer melts during lamination and at least partially flows into an adjacent second outer layer comprising a woven fabric.

In various embodiments, at least one intervening film is disposed between UD plies wherein the film improves adhesion and shear properties and acts as a strain isolator, isolating the two unitape ply layers on either side of the film. An intervening film layer disposed between unitape plies also offers additional fiber stability and prevents fiber pull-out. When an intervening film layer is disposed between a unitape layer and a woven layer, such as a first or second outer layer as disclosed herein, the film creates a hybrid resin system with hybrid flex and rigidity. Intervening film layers also transfer shear loads from a woven fabric layer to the unitape layer to prevent combing. The use of intervening films in general also reduces the cost of a lightweight laminate by reducing resin, and the films in general provide additional barriers to attack of the lightweight laminate by moisture. In various embodiments, an intervening film disposed between unitape plies comprises 0.1-5 mil thick PE, LDPE, PP, PU, or PET. In various embodiments, an intervening film disposed between unitape plies comprises 0.5 or 1.0 mil thick LDPE.

Intervening film layers, like fibers, may also be characterized, for example, by stretch and strength parameters in addition to their chemical composition and thickness, such as tensile strength and modulus. For example, tensile properties of thin films can be measured in accordance with ISO 1184(H).

Lightweight Laminates

Figure 2:
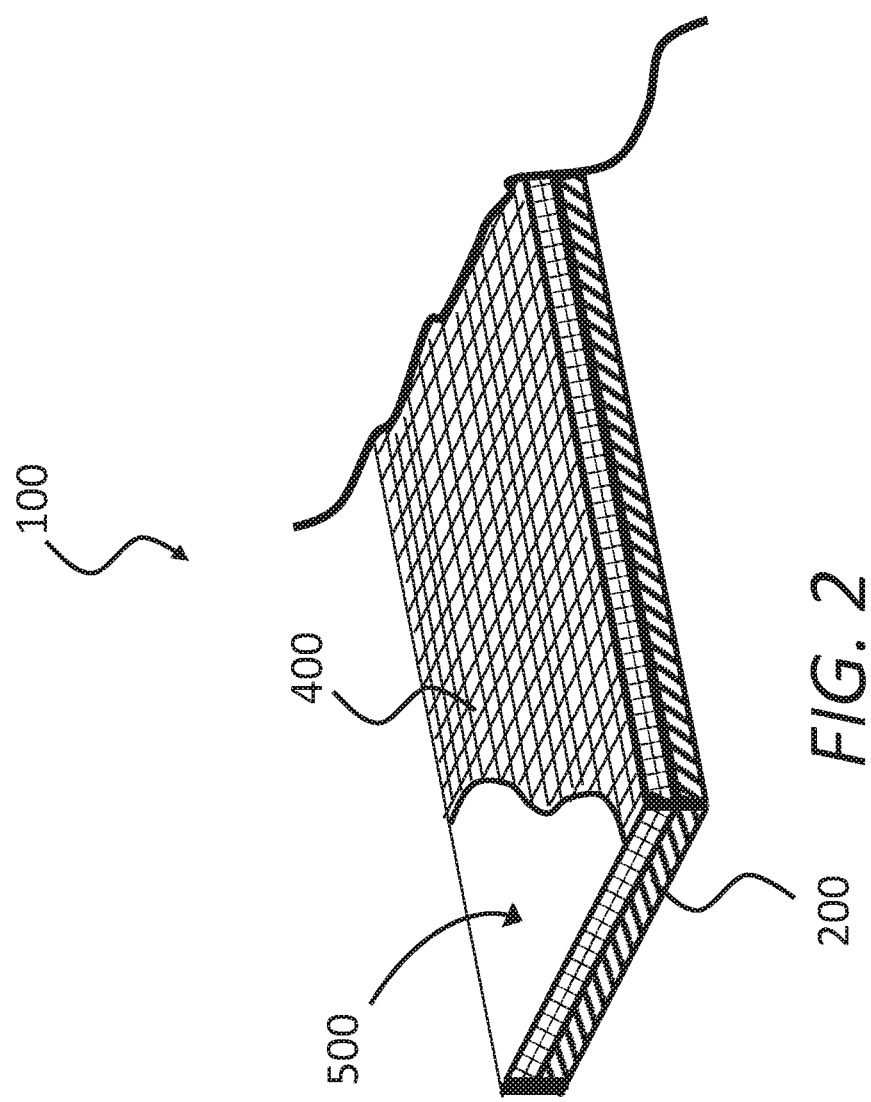
FIG. 2 illustrates a perspective view of an embodiment of a lightweight laminate in accordance with the present disclosure.

With reference now to FIG. 2, a non-limiting embodiment of a lightweight laminate 100, in accordance with the present disclosure, is illustrated in perspective view. Lightweight laminate 100 comprises a first outer layer 200 as shown. As discussed above, first outer layer 200 can be, inter alia, a woven cloth (e.g. 1000 denier (Cordura®) Nylon or other suitable fabric) already printed with color/pattern, such as MultiCam®, on the exposed side (the underside of first outer layer 200 in FIG. 2, which is not visible from this perspective). Bonded onto one side of the first outer layer 200 (e.g. the side without any coloring/patterning) is a second outer layer 400. As discussed above, the second outer layer can be, inter alia, a woven cloth comprising a weave of UHMWPE (e.g. Dyneema®), liquid crystalline polymer (e.g. Vectran®), aramid (e.g. Kevlar®, or Nomex®), nylon, cotton, polyester, rayon, or any combinations thereof, whereby any of these fibers may have any practical denier and any tenacity. For example, the second outer layer can comprise UHMWPE fibers (e.g. Dyneema®) having tenacity of >1.5 GPa, >2.0 GPa, >3.5 GPa, >4.0 GPa, or >4.5 GPa. Provided an additional layer is not added, the exposed side of the second outer layer 400 will be placed in contact with the wearer of apparel fashioned from this lightweight laminate. Further, the exposed side of the first outer layer 200 will be displayed outward as the outside of apparel fashioned from this lightweight laminate. As mentioned, one purpose for using a woven material layer for the inside of a laminate product (i.e., for the second outer layer 400) is to provide "material properties." Such properties obtained by use of a second outer layer include, for example, tear resistance, strength, stretch resistance, abrasion resistance, texture and feel, color and/or pattern.

With continued reference to FIG. 2, the second outer layer 400 further comprises a wet-out resin 500 applied to one or both sides of the side of second outer layer 400, such that the second outer layer 400 is saturated, partially saturated and coated, or partially coated with wet-out resin 500. In various embodiments, second outer layer 400 comprises a pre-preg further comprising the wet-out resin 500. In various embodiments, the wet-out resin 500 originates exclusively, substantially, or at least partly from a backside film applied to the second outer layer.

In various embodiments, the wet-out resin 500 infiltrates into the second outer layer from at least one of: (i) a high resin content unitape in contact with either or both sides of the second outer layer; (ii) a resin coated onto, or resin film applied to, the side of the second outer layer opposite the first outer layer; or (iii) a backside film layer (having resin) placed into contact with the side of the second outer layer opposite the first outer layer. In various embodiments, second outer layer 400 comprises UHMWPE (e.g. Dyneema®) woven. In various embodiments, a substantially or completely dry second outer layer 400 is applied to the first outer layer 200, and then at a later time second outer layer 400 is partially or fully infiltrated with wet-out resin 500.

In the embodiment depicted, a wet-out resin 500 is used to at least partially, or fully, saturate the available voids within second outer layer 400, e.g. including interstices between monofilaments, interstices between fiber bundles, and interstices between the windows bounded fiber cross-over points. In various embodiments, the second outer layer 400 may be wet-out to an "oversaturation level." Although shown in this embodiment only as partly saturating one portion of one side of the second outer layer 400, the second outer layer 400 may be saturated, partially saturated and coated, or partially coated with the wet-out resin 500. In various embodiments, a wet-out resin 500 may be uniform across the surface of second outer layer 400. In various embodiments, the second outer layer 400 is applied dry and any wet-out resin present in the second layer 400 infiltrates in from the adjacent unitape.

With continuing reference to FIG. 2, lightweight laminate 100 may optionally comprise a backside film (not illustrated) laminated to the exposed side of the second outer layer 400. In various embodiments, a backside film can be bonded to the second outer layer 400 using the wet-out resin 500 as an adhesive. In this way, a backside film, such as a waterproof/breathable membrane, can be adhered to the second outer layer before the wet-out resin present in the second outer layer cures or before it is manually cured.

Figure 3:
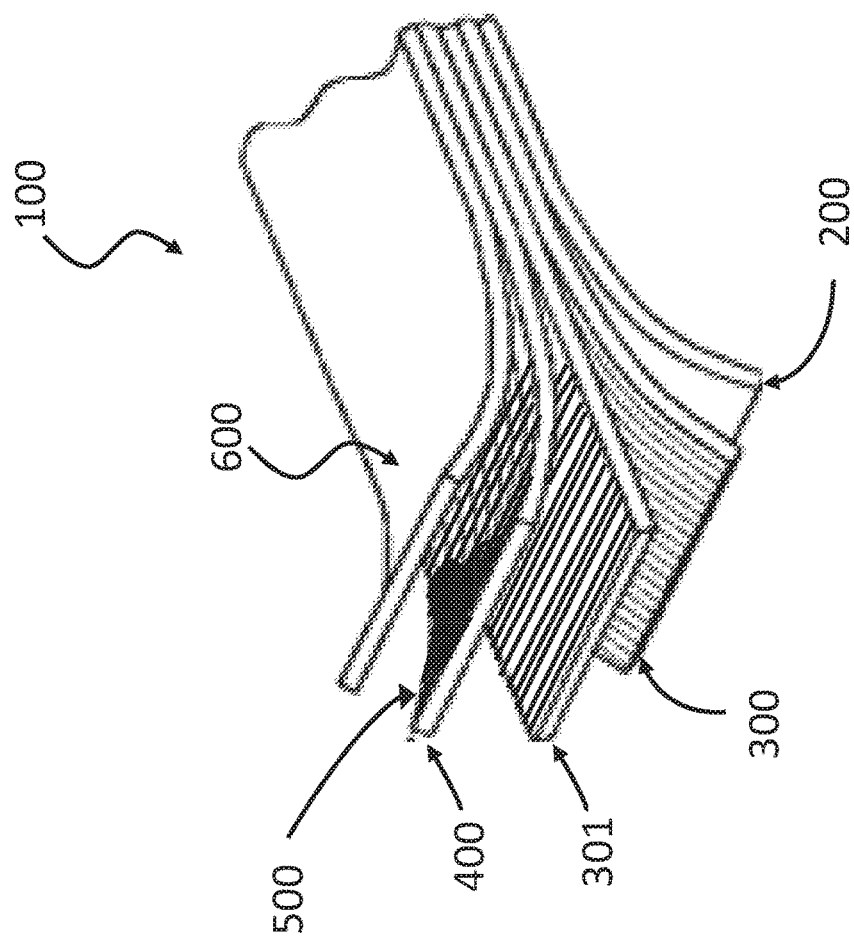
FIG. 3 illustrates a perspective view of another embodiment of a lightweight laminate in accordance with the present disclosure.

With reference now to FIG. 3, another non-limiting embodiment of a lightweight laminate 100 in accordance with the present disclosure is illustrated in perspective view, with the layers artificially splayed open for illustrative purposes. Lightweight laminate 100 comprises a first outer layer 200. As discussed above, first outer layer 200 can be, inter alia, a woven cloth (e.g. 1000 denier Cordura® Nylon or other suitable fabric) already printed with color/pattern, such as MultiCam®, on its exposed side (the underside of first outer layer 200 in FIG. 3, which is not visible from this perspective). First outer layer 200 is bonded to a first unitape 300 and a second unitape 301. Both unitapes 300 and 301 comprise parallel monofilaments embedded in a resin. As depicted, the direction of the parallel fibers in unitape 300 is 90° to the direction of the parallel fibers in unitape 301, although any other orientation of the fiber directions is within the scope of the present disclosure. Two or more unitapes can be stacked such that the fiber directions and relative orientation of fiber direction between unitape layers conform to a planned arrangement. As discussed, additional intervening internal reinforcing layers may be present, such as additional unitape layers, in which case unitapes 300 and 301, together with the additional internal reinforcing layers, may be oriented relative to one another and oriented relative to the warp direction of either the first or second outer layers as desired, and then bonded together to form an internal reinforcing core usable within the lightweight laminate 100.

With continued reference to FIG. 3, lightweight laminate 100 further comprises a second outer layer 400 bonded to the one or more internal reinforcing layers 300, 301 (e.g. to the reinforcing core of structural layers) on the side not already bonded to first outer layer 200. As depicted, first outer layer 200 and second outer layer 400 form the outer layers of a laminate wherein layers 200 and 400 sandwich the internal reinforcing layers 300 and 301, or sandwich an internal reinforcing core of several or more internal layers.

With further reference to FIG. 3, second outer layer 400 is saturated, partially saturated and coated, or partially coated with a wet-out resin 500. As discussed, second outer layer 400 is wet-out with wet-out resin 500, and in various embodiments, the second outer layer 400 comprises a prepreg further comprising wet-out resin 500. In various embodiments, a substantially or completely dry second outer layer 400 is applied to the internal reinforcing layer(s) (e.g. 300 or 301), and then at a later time, second outer layer 400 is partially or fully infiltrated with wet-out resin 500.

As discussed above, a wet-out resin is used to at least partially, or fully, saturate the available voids within second outer layer 400, including interstices between monofilaments, interstices between fiber bundles, and interstices between the windows bounded fiber crossover points. As mentioned, the second outer layer 400 may be wet-out to an "oversaturation level." Although shown only as partly saturating one portion of one side of the second outer layer 400, the second outer layer 400 may be saturated, partially saturated and coated, or partially coated with the wet-out resin 500. In various embodiments, a wet-out resin 500 may be uniform across the surface of second outer layer 400.

In the illustration of FIG. 3, the wet-out resin 500 is shown as only partially coating one side of the second outer layer 400 for illustrative purposes only, since second outer layer 400 is saturated, partially saturated and coated, or partially coated with a wet-out resin 500 on either or both sides of 400, or all the way through second outer layer 400 (saturated). As discussed above, the wetting-out of the second outer layer 400 with the wet-out resin 500 can be to any extent desired (e.g. as measured by the weight % or the wet-out resin 500 present in the second outer layer 400), such as to partially fill the voids within 400, or to wet-out the second outer layer 400 beyond saturation. For example, breathable lightweight laminates 100 may comprise a second outer layer 400 wherein the voids within 400 are only partially filled with wet-out resin 500.

With continued reference to FIG. 3, lightweight laminate 100 may optionally comprise backside film 600 on the second outer layer 400. As discussed above, this layer may comprise a waterproof/breathable membrane, any woven or nonwoven, or felt, or any other type of material layer. Backside film 600 can be bonded to the second outer layer 400 by the wet-out resin 500 present in the second outer layer 400. In various embodiments, the second outer layer 400 may be wet-out with wet-out resin 500 to a degree beyond saturation of the available voids, giving excess resin 500 usable as a bonding agent to bond backside film 600 onto second outer layer 400.

Figure 4:
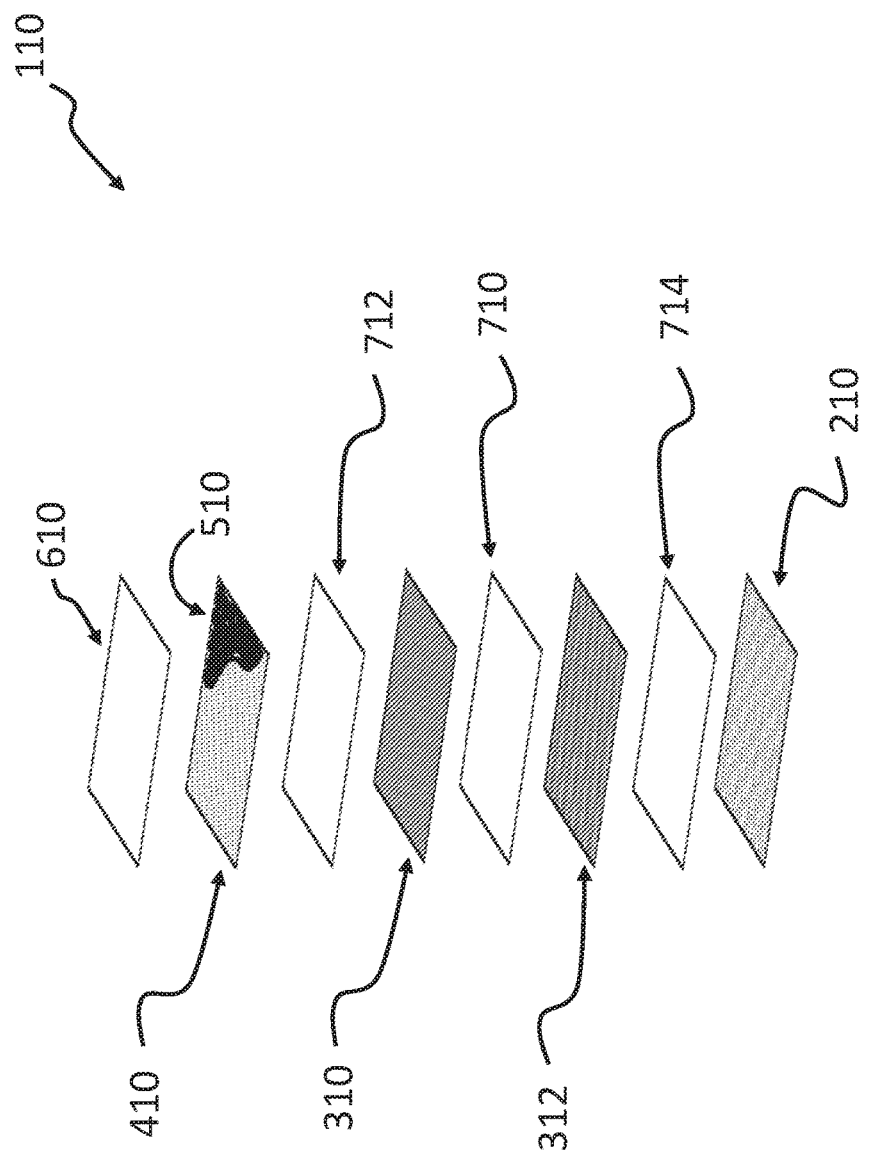
FIG. 4 illustrates diagrammatically an embodiment of a layup of a lightweight laminate comprising intervening film layers in accordance with the present disclosure.

With reference now to FIG. 4, another non-limiting embodiment of a lightweight laminate 110 in accordance with the present disclosure is illustrated in perspective view, with the laminate artificially deconstructed into its constituent layers for illustrative purposes. Lightweight laminate 110 comprises a first outer layer 210. As discussed above, first outer layer 210 can be, inter alia, a woven cloth (e.g. 1000 denier Cordura® Nylon or other suitable fabric) already printed with color/pattern, such as MultiCam®, on its exposed side (the underside of first outer layer 210 in FIG. 4, which is not visible from this perspective). First outer layer 210 is separated from first unitape layer 312 by intervening film layer 714. Intervening film layer 712 may be an adhesive film layer in that it melts and bonds first outer layer 210 to first unitape layer 312 during lamination. In other embodiments, intervening film layer 714 is chosen to remain partially or substantially intact after lamination, such that it can affect the interaction between first outer layer 210 and the first unitape layer 312. In various embodiments, the desired interaction is one of slippage, in which case the intervening film layer 714 can comprise polyurethane optionally treated with antistatic/slip additives to reduce friction. Unitape layers 310 and 312 together form an internal reinforcing core for the lightweight laminate 110. Both unitapes 310 and 312 comprise parallel monofilaments embedded in a resin. As depicted, the direction of the parallel fibers in unitape 310 is 90° relative to the direction of the parallel fibers in unitape 312, although any other orientation of the fiber directions is within the scope of the present disclosure. Two or more unitapes can be stacked such that the fiber directions and relative orientation of fiber direction between unitape layers conform to a planned arrangement. In the embodiment depicted, an intervening film layer 710 is disposed between unitape ply layers 310 and 312. As discussed, intervening film layer 710 may melt and flow during lamination or remain partly or substantially intact and unchanged after lamination. As also discussed, additional intervening internal reinforcing layers may be present, such as additional unitape layers, in which case unitapes 310 and 312, together with the additional internal reinforcing layers and optional intervening film layers distributed between, may be oriented relative to one another and oriented relative to the warp direction of either the first or second outer layers as desired, and then bonded together to form an internal reinforcing core usable within the lightweight laminate 110.

With continued reference to FIG. 4, lightweight laminate 110 further comprises a second outer layer 410 bonded to the one or more internal reinforcing layers 310, 312 (e.g. to the reinforcing core of structural layers) on the side not already bonded to first outer layer 210. As shown, an additional intervening film layer 712 is used to separate and/or bond the second outer layer 410 to the unitape layer 310. As depicted, first outer layer 210 and second outer layer 410 form the outer layers of a laminate.

With further reference to FIG. 4, second outer layer 410 is saturated, partially saturated and coated, or partially coated with a wet-out resin 510. As discussed, second outer layer 410 is wet-out with wet-out resin 510, and in various embodiments, the second outer layer 410 comprises a prepreg further comprising wet-out resin 510 e.g. in a partly cured state. In various embodiments, a substantially or completely dry second outer layer 410 is applied to the internal reinforcing layer(s) (e.g. 310 or 312, optionally via bonding from intervening film layer 712), and then at a later time, second outer layer 410 is partially or fully infiltrated with wet-out resin 510.

As discussed above, a wet-out resin is used to at least partially, or fully, saturate the available voids within second outer layer 410, including interstices between monofilaments, interstices between fiber bundles, and interstices between the windows bounded fiber crossover points. As mentioned, the second outer layer 410 may be wet-out to an "oversaturation level." Although shown only as partly saturating one portion of one side of the second outer layer 410, the second outer layer 410 may be saturated, partially saturated and coated, or partially coated with the wet-out resin 510. In various embodiments, a wet-out resin 510 may be uniform across the surface of second outer layer 410.

In the illustration of FIG. 4, the wet-out resin 510 is shown as only partially coating one side of the second outer layer 410 for illustrative purposes only, since second outer layer 410 is saturated, partially saturated and coated, or partially coated with a wet-out resin 510 on either or both sides of 410, or all the way through second outer layer 410 (saturated). As discussed above, the wetting-out of the second outer layer 410 with the wet-out resin 510 can be to any extent desired (e.g. as measured by the weight % or the wet-out resin 510 present in the second outer layer 410), such as to partially fill the voids within 410, or to wet-out the second outer layer 410 beyond saturation. For example, breathable lightweight laminates 110 may comprise a second outer layer 410 wherein the voids within 410 are only partially filled with wet-out resin 510. In other embodiments, minimal amounts of wet-out resin 510 are used such that the resulting laminate 110 undergoes rapid de-lamination upon impact with a projectile rather than deformation with fiber pull-out.

With continued reference to FIG. 4, lightweight laminate 110 may optionally comprise backside film 610 on the second outer layer 410. As discussed above, this layer may comprise a waterproof/breathable membrane, any woven or nonwoven, or felt, or any other type of material layer. Backside film 610 can be bonded to the second outer layer 410 by the wet-out resin 510 present in the second outer layer 410. In various embodiments, the second outer layer 410 may be wet-out with wet-out resin 510 to a degree beyond saturation of the available voids, giving excess resin 510 usable as a bonding agent to bond backside film 610 onto second outer layer 410.

Figure 5:
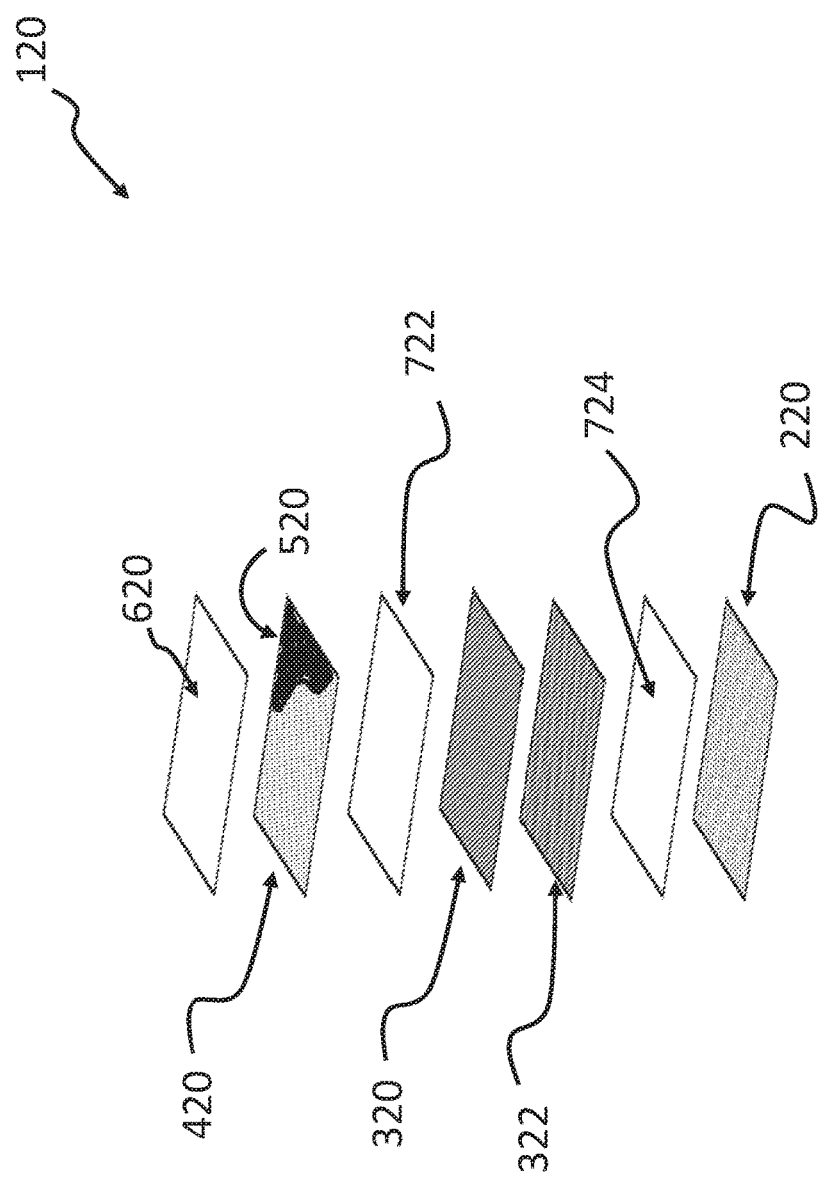
FIG. 5 illustrates diagrammatically another embodiment of a layup of a lightweight laminate comprising intervening film layers in accordance with the present disclosure.

With reference now to FIG. 5, another non-limiting embodiment of a lightweight laminate 120 in accordance with the present disclosure is illustrated in perspective view, with the laminate artificially deconstructed into its constituent layers for illustrative purposes. Lightweight laminate 120 comprises a first outer layer 220. As discussed above, first outer layer 220 can be, inter alia, a woven cloth (e.g. 1000 denier Cordura® Nylon or other suitable fabric) already printed with color/pattern, such as MultiCam®, on its exposed side (the underside of first outer layer 220 in FIG. 5, which is not visible from this perspective). First outer layer 220 is separated from first unitape layer 322 by intervening film layer 724. Intervening film layer 724 may be an adhesive film layer in that it melts and bonds first outer layer 220 to first unitape layer 322 during lamination. In other embodiments, intervening film layer 724 is chosen to remain partially or substantially intact after lamination, such that it can affect the interaction between first outer layer 220 and the first unitape layer 322. In various embodiments, the desired interaction is one of slippage, in which case the intervening film layer 724 can comprise polyurethane optionally treated with antistatic/slip additives to reduce friction. Unitape layers 320 and 322 together form an internal reinforcing core for the lightweight laminate 120. Both unitapes 310 and 312 comprise parallel monofilaments embedded in a resin. As depicted, the direction of the parallel fibers in unitape 320 is 90° relative to the direction of the parallel fibers in unitape 322, although any other orientation of the fiber directions is within the scope of the present disclosure. Two or more unitapes can be stacked such that the fiber directions and relative orientation of fiber direction between unitape layers conform to a planned arrangement. As discussed, additional internal reinforcing layers may be present, such as additional unitape layers, in which case unitapes 320 and 322, together with the additional internal reinforcing layers, may be oriented relative to one another and oriented relative to the warp direction of either the first or second outer layers as desired, and then bonded together to form an internal reinforcing core usable within the lightweight laminate 120.

With continued reference to FIG. 5, lightweight laminate 120 further comprises a second outer layer 420 bonded to the one or more internal reinforcing layers 320, 322 (e.g. to the reinforcing core of structural layers) on the side not already bonded to first outer layer 220. As shown, an additional intervening film layer 722 is used to separate and/or bond the second outer layer 420 to the unitape layer 320. As depicted, first outer layer 220 and second outer layer 420 form the outer layers of a laminate.

With further reference to FIG. 5, second outer layer 420 is saturated, partially saturated and coated, or partially coated with a wet-out resin 520. As discussed, second outer layer 420 is wet-out with wet-out resin 520, and in various embodiments, the second outer layer 420 comprises a prepreg further comprising wet-out resin 520 e.g. in a partly cured state. In various embodiments, a substantially or completely dry second outer layer 420 is applied to the internal reinforcing layer(s) (e.g. 320 or 322, optionally via bonding from intervening film layer 722), and then at a later time, second outer layer 420 is partially or fully infiltrated with wet-out resin 520.

As discussed above, a wet-out resin is used to at least partially, or fully, saturate the available voids within second outer layer 420, including interstices between monofilaments, interstices between fiber bundles, and interstices between the windows bounded fiber crossover points. As mentioned, the second outer layer 420 may be wet-out to an "oversaturation level." Although shown only as partly saturating one portion of one side of the second outer layer 420, the second outer layer 420 may be saturated, partially saturated and coated, or partially coated with the wet-out resin 520. In various embodiments, a wet-out resin 520 may be uniform across the surface of second outer layer 420.

In the illustration of FIG. 5, the wet-out resin 520 is shown as only partially coating one side of the second outer layer 420 for illustrative purposes only, since second outer layer 420 is saturated, partially saturated and coated, or partially coated with a wet-out resin 520 on either or both sides of 420, or all the way through second outer layer 420 (saturated). As discussed above, the wetting-out of the second outer layer 420 with the wet-out resin 520 can be to any extent desired (e.g. as measured by the weight % or the wet-out resin 520 present in the second outer layer 420), such as to partially fill the voids within 420, or to wet-out the second outer layer 420 beyond saturation. For example, breathable lightweight laminates 120 may comprise a second outer layer 420 wherein the voids within 420 are only partially filled with wet-out resin 520. In other embodiments, minimal amounts of wet-out resin 520 are used such that the resulting laminate 120 undergoes rapid de-lamination upon impact with a projectile rather than deformation with fiber pull-out.

With continued reference to FIG. 5, lightweight laminate 120 may optionally comprise backside film 620 on the second outer layer 420. As discussed above, this layer may comprise a waterproof/breathable membrane, any woven or nonwoven, or felt, or any other type of material layer. Backside film 620 can be bonded to the second outer layer 420 by the wet-out resin 520 present in the second outer layer 420. In various embodiments, the second outer layer 420 may be wet-out with wet-out resin 520 to a degree beyond saturation of the available voids, giving excess resin 520 usable as a bonding agent to bond backside film 620 onto second outer layer 420.

When used in construction of a plate-carrier vest or any other military or recreational apparel, the underside of first outer layer 200, 210 or 220 as depicted in FIGS. 3, 4 and 5, respectively (the outer surface of each, which are not visible from these three perspective illustrations) may become the outer surface of the apparel, i.e. the surface that observers would see if viewing an individual wearing such an article of manufacture. In various embodiments, typically either the outer surface of second outer layer 400, 410 or 420, or if included, the outermost surface of optional backside film 600, 610 or 620, will constitute the surface of the article placed into contact with the wearer of the article.

Additional Layers and Coatings

In various embodiments, the lightweight laminate may comprise additional layers such as a cloth or a final membrane layer, such as to form a final laminate having particular structural, rigidity, flexibility, permeability, liquid moisture blocking, feel, comfort, or texture necessary for a particular application of the lightweight laminate product. Further, the lightweight laminate may comprise any necessary coatings, such as to either or both sides of the lightweight laminate product, or to any of the intervening layers, as necessary for a particular application. In one non-limiting example, the first outer layer comprises polyurethane coated woven fabric, such as polyurethane coated 1000 denier Cordura® Nylon.

Exemplary Lightweight Laminate Structures

EXAMPLE 1

| Layer | Description |
| --- | --- |
| 1 | 70-1000 d nylon or polyester first outer layer, optionally urethane coated, e.g. about 12 oz/yd² |
| 2 | 1 or 2 mil urethane or .18 or .5 mil polyester intervening film layer |
| 3 | 0° Dyneema® fiber unitape ply layer; 52% resin content, 13.78 gsm FAW, 30 gsm Total Areal Weight |
| 4 | 90° Dyneema® fiber unitape ply layer; 52% resin content, 13.78 gsm FAW, 30 gsm Total Areal Weight |
| 5 | +45° Dyneema® fiber unitape ply layer; 52% resin content, 13.78 gsm FAW, 30 gsm Total Areal Weight |
| 6 | −45° Dyneema® fiber unitape ply layer; 52% resin content, 13.78 gsm FAW, 30 gsm Total Areal Weight |
| 7 | Woven Dyneema®, 375d square weave second outer layer; 40% resin pre-impregnated, 103 gsm FAW, about 175 gsm Total Areal Weight. |
| 8 | Urethane or polyester backside film, 1 or 2 mil thick |

EXAMPLE 2

| Layer | Description |
| --- | --- |
| 1 | 70-1000 d nylon or polyester first outer layer, optionally urethane coated, e.g. about 12 oz/yd² |
| 2 | 1 or 2 mil urethane or .18 or .5 mil polyester intervening film layer |
| 3 | 0° Dyneema® fiber unitape ply layer; 52% resin content, 13.78 gsm FAW, 30 gsm Total Areal Weight |
| 4 | 90° Dyneema® fiber unitape ply layer; 52% resin content, 13.78 gsm FAW, 30 gsm Total Areal Weight |
| 5 | +45° Dyneema® fiber unitape ply layer; 52% resin content, 13.78 gsm FAW, 30 gsm Total Areal Weight |
| 6 | −45° Dyneema® fiber unitape ply layer; 52% resin content, 13.78 gsm FAW, 30 gsm Total Areal Weight |
| 7 | Woven Dyneema®, 375 d square weave second outer layer, dry; 103 gsm FAW, 1-10% wet-out resin. |
| 8 | Urethane or polyester backside film, 1 or 2 mil thick |

EXAMPLE 3

| Layer | Description |
| --- | --- |
| 1 | 70-1000 d nylon or polyester first outer layer, optionally urethane coated, e.g. about 12 oz/yd² |
| 2 | 1 or 2 mil urethane or .18 or .5 mil polyester intervening film layer |
| 3 | 0° Dyneema® fiber unitape ply layer; 52% resin content, 13.78 gsm FAW, 30 gsm Total Areal Weight |
| 4 | 90° Dyneema® fiber unitape ply layer; 52% resin content, 13.78 gsm FAW, 30 gsm Total Areal Weight |
| 5 | +45° Dyneema® fiber unitape ply layer; 52% resin content, 13.78 gsm FAW, 30 gsm Total Areal Weight |
| 6 | −45° Dyneema® fiber unitape ply layer; 52% resin content, 13.78 gsm FAW, 30 gsm Total Areal Weight |
| 7 | 1 or 2 mil urethane or .18 or .5 mil polyester intervening film layer |
| 8 | Woven Dyneema®, 375 d square weave second outer layer; 40% resin preimpregnated, 103 gsm FAW, about 175 gsm Total Areal Weight |
| 9 | Urethane or polyester backside film, 1 or 2 mil thick |

EXAMPLE 4

| Layer | Description |
| --- | --- |
| 1 | 70-1000 d nylon or polyester first outer layer, optionally urethane coated, e.g. about 12 oz/yd² |
| 2 | 1 or 2 mil urethane or .18 or .5 mil polyester intervening film layer |
| 3 | 0° Dyneema® fiber unitape ply layer; 52% resin content, 13.78 gsm FAW, 30 gsm Total Areal Weight |
| 4 | 90° Dyneema® fiber unitape ply layer; 52% resin content, 13.78 gsm FAW, 30 gsm Total Areal Weight |
| 5 | +45° Dyneema® fiber unitape ply layer; 52% resin content, 13.78 gsm FAW, 30 gsm Total Areal Weight |
| 6 | −45° Dyneema® fiber unitape ply layer; 52% resin content, 13.78 gsm FAW, 30 gsm Total Areal Weight |
| 7 | 1 or 2 mil urethane or .18 or .5 mil polyester intervening film layer |
| 8 | Woven Dyneema®, 375 d square weave second outer layer, dry; 103 gsm FAW, 1-10% wet-out resin. |
| 9 | Urethane or polyester backside film, 1 or 2 mil thick |

EXAMPLE 5

| Layer | Description |
| --- | --- |
| 1 | 70-1000 d nylon or polyester first outer layer, optionally urethane coated, e.g. about 12 oz/yd² |
| 2 | 1 or 2 mil urethane or .18 or .5 mil polyester intervening film layer |
| 3 | 0° Dyneema® fiber unitape ply layer; 52% resin content, 13.78 gsm FAW, 30 gsm Total Areal Weight |
| 4 | 0.5 mil or 1 mil LDPE intervening film layer |
| 5 | 90° Dyneema® fiber unitape ply layer; 52% resin content, 13.78 gsm FAW, 30 gsm Total Areal Weight |
| 6 | 0.5 mil or 1 mil LDPE intervening film layer |
| 7 | +45° Dyneema® fiber unitape ply layer; 52% resin content, 13.78 gsm FAW, 30 gsm Total Areal Weight |

-continued

| Layer | Description |
|---|---|
| 8 | 0.5 mil or 1 mil LDPE intervening film layer |
| 9 | −45° Dyneema ® fiber unitape ply layer; 52% resin content, 13.78 gsm FAW, 30 gsm Total Areal Weight |
| 10 | 1 or 2 mil urethane or .18 or .5 mil polyester intervening film layer |
| 11 | Woven Dyneema ®, 375 d square weave second outer layer; 40% resin preimpregnated, 103 gsm FAW, about175 gsm Total Areal Weight |
| 12 | Urethane or polyester backside film, 1 or 2 mil thick |

EXAMPLE 6

| Layer | Description |
|---|---|
| 1 | 70-1000 d nylon or polyester first outer layer, optionally urethane coated, e.g. about 12 oz/yd$^2$ |
| 2 | 1 or 2 mil urethane or .18 or .5 mil polyester intervening film layer |
| 3 | 0° Dyneema ® fiber unitape ply layer; 52% resin content, 13.78 gsm FAW, 30 gsm Total Areal Weight |
| 4 | 0.5 mil or 1 mil LDPE intervening film layer |
| 5 | 90° Dyneema ® fiber unitape ply layer; 52% resin content, 13.78 gsm FAW, 30 gsm Total Areal Weight |
| 6 | 0.5 mil or 1 mil LDPE intervening film layer |
| 7 | +45° Dyneema ® fiber unitape ply layer; 52% resin content, 13.78 gsm FAW, 30 gsm Total Areal Weight |
| 8 | 0.5 mil or 1 mil LDPE intervening film layer |
| 9 | −45° Dyneema ® fiber unitape ply layer; 52% resin content, 13.78 gsm FAW, 30 gsm Total Areal Weight |
| 10 | 1 or 2 mil urethane or .18 or .5 mil polyester intervening film layer |
| 11 | Woven Dyneema ®, 375 d square weave second outer layer, dry; 103 gsm FAW, 1-10% wet-out resin. |
| 12 | Urethane or polyester backside film, 1 or 2 mil thick |

EXAMPLE 7

| Layer | Description |
|---|---|
| 1 | 70-1000 d nylon or polyester first outer layer, optionally urethane coated, e.g. about 12 oz/yd$^2$ |
| 2 | 1 or 2 mil urethane or .18 or .5 mil polyester intervening film layer |
| 3 | +45° Dyneema ® fiber unitape ply layer; 52% resin content, 13.78 gsm FAW, 30 gsm Total Areal Weight |
| 4 | −45° Dyneema ® fiber unitape ply layer; 52% resin content, 13.78 gsm FAW, 30 gsm Total Areal Weight |
| 5 | Woven Dyneema ®, 375 d square weave second outer layer; 40% resin preimpregnated, 103 gsm FAW, about175 gsm Total Areal Weight |
| 6 | Urethane or polyester backside film, 1 or 2 mil thick |

EXAMPLE 8

| Layer | Description |
|---|---|
| 1 | 70-1000 d nylon or polyester first outer layer, optionally urethane coated, e.g. about 12 oz/yd$^2$ |
| 2 | 1 or 2 mil urethane or .18 or .5 mil polyester intervening film layer |
| 3 | +45° Dyneema ® fiber unitape ply layer; 52% resin content, 13.78 gsm FAW, 30 gsm Total Areal Weight |
| 4 | −45° Dyneema ® fiber unitape ply layer; 52% resin content, 13.78 gsm FAW, 30 gsm Total Areal Weight |
| 5 | Woven Dyneema ®, 375 d square weave second outer layer, dry; 103 gsm FAW, 1-10% wet-out resin. |
| 6 | Urethane or polyester backside film, 1 or 2 mil thick |

EXAMPLE 9

| Layer | Description |
|---|---|
| 1 | 70-1000 d nylon or polyester first outer layer, optionally urethane coated, e.g. about 12 oz/yd$^2$ |
| 2 | 1 or 2 mil urethane or .18 or .5 mil polyester intervening film layer |
| 3 | +45° Dyneema ® fiber unitape ply layer; 52% resin content, 13.78 gsm FAW, 30 gsm Total Areal Weight |
| 4 | −45° Dyneema ® fiber unitape ply layer; 52% resin content, 13.78 gsm FAW, 30 gsm Total Areal Weight |
| 5 | 1 or 2 mil urethane or .18 or .5 mil polyester intervening film layer |
| 6 | Woven Dyneema ®, 375 d square weave second outer layer; 40% resin preimpregnated, 103 gsm FAW, about175 gsm Total Areal Weight |
| 7 | Urethane or polyester backside film, 1 or 2 mil thick |

EXAMPLE 10

| Layer | Description |
|---|---|
| 1 | 70-1000 d nylon or polyester first outer layer, optionally urethane coated, e.g. about 12 oz/yd$^2$ |
| 2 | 1 or 2 mil urethane or .18 or .5 mil polyester intervening film layer |
| 3 | +45° Dyneema ® fiber unitape ply layer; 52% resin content, 13.78 gsm FAW, 30 gsm Total Areal Weight |
| 4 | −45° Dyneema ® fiber unitape ply layer; 52% resin content, 13.78 gsm FAW, 30 gsm Total Areal Weight |
| 5 | 1 or 2 mil urethane or .18 or .5 mil polyester intervening film layer |
| 6 | Woven Dyneema ®, 375 d square weave second outer layer, dry; 103 gsm FAW, 1-10% wet-out resin. |
| 7 | Urethane or polyester backside film, 1 or 2 mil thick |

EXAMPLE 11

| Layer | Description |
|---|---|
| 1 | 70-1000 d nylon or polyester first outer layer, optionally urethane coated, e.g. about 12 oz/yd$^2$ |
| 2 | 1 or 2 mil urethane or .18 or .5 mil polyester intervening film layer |
| 3 | +45° Dyneema ® fiber unitape ply layer; 52% resin content, 13.78 gsm FAW, 30 gsm Total Areal Weight |
| 4 | 0.5 mil or 1 mil LDPE intervening film layer |
| 5 | −45° Dyneema ® fiber unitape ply layer; 52% resin content, 13.78 gsm FAW, 30 gsm Total Areal Weight |
| 6 | 1 or 2 mil urethane or .18 or .5 mil polyester intervening film layer |
| 7 | Woven Dyneema ®, 375 d square weave second outer layer; 40% resin preimpregnated, 103 gsm FAW, about175 gsm Total Areal Weight |
| 8 | Urethane or polyester backside film, 1 or 2 mil thick |

EXAMPLE 12

| Layer | Description |
|---|---|
| 1 | 70-1000 d nylon or polyester first outer layer, optionally urethane coated, e.g. about 12 oz/yd$^2$ |
| 2 | 1 or 2 mil urethane or .18 or .5 mil polyester intervening film layer |
| 3 | +45° Dyneema ® fiber unitape ply layer; 52% resin content, 13.78 gsm FAW, 30 gsm Total Areal Weight |
| 4 | 0.5 mil or 1 mil LDPE intervening film layer |
| 5 | −45° Dyneema ® fiber unitape ply layer; 52% resin content, 13.78 gsm FAW, 30 gsm Total Areal Weight |
| 6 | 1 or 2 mil urethane or .18 or .5 mil polyester intervening film layer |

EXAMPLE 13

Layer Description 1. 70-1000 d nylon or polyester first outer layer, optionally urethane coated, e.g. about 12 oz/yd$^2$
2. 0.5 mil or 1 mil LDPE intervening film layer
3. +45° Dyneema ® fiber unitape ply layer; 52% resin content, 13.78 gsm FAW, 30 gsm Total Areal Weight
4. 1 or 2 mil urethane or .18 or .5 mil polyester intervening film layer
5. −45° Dyneema ® fiber unitape ply layer; 52% resin content, 13.78 gsm FAW, 30 gsm Total Areal Weight
6. 0.5 mil or 1 mil LDPE intervening film layer
7. Woven Dyneema ®, 375 d square weave second outer layer; 40% resin preimpregnated, 103 gsm FAW, about175 gsm Total Areal Weight
8. Urethane or polyester backside film, 1 or 2 mil thick

EXAMPLE 14

Layer Description 1. 70-1000 d nylon or polyester first outer layer, optionally urethane coated, e.g. about 12 oz/yd$^2$
2. 0.5 mil or 1 mil LDPE intervening film layer
3. +45° Dyneema ® fiber unitape ply layer; 52% resin content, 13.78 gsm FAW, 30 gsm Total Areal Weight
4. 1 or 2 mil urethane or .18 or .5 mil polyester intervening film layer
5. −45° Dyneema ® fiber unitape ply layer; 52% resin content, 13.78 gsm FAW, 30 gsm Total Areal Weight
6. 0.5 mil or 1 mil LDPE intervening film layer
7. Woven Dyneema ®, 375 d square weave second outer layer, dry; 103 gsm FAW, 1-10% wet-out resin.
8. Urethane or polyester backside film, 1 or 2 mil thick

EXAMPLE 15

Layer Description 1. 70-1000 d nylon or polyester first outer layer, optionally urethane coated, e.g. about 12 oz/yd$^2$
2. 0.5 mil or 1 mil LDPE intervening film layer
3. +45° Dyneema ® fiber unitape ply layer; 52% resin content, 13.78 gsm FAW, 30 gsm Total Areal Weight
4. 0.5 mil or 1 mil LDPE intervening film layer
5. −45° Dyneema ® fiber unitape ply layer; 52% resin content, 13.78 gsm FAW, 30 gsm Total Areal Weight
6. 0.5 mil or 1 mil LDPE intervening film layer
7. Woven Dyneema ®, 375 d square weave second outer layer; 40% resin preimpregnated, 103 gsm FAW, about175 gsm Total Areal Weight
8. Urethane or polyester backside film, 1 or 2 mil thick

EXAMPLE 16

Layer Description 1. 70-1000 d nylon or polyester first outer layer, optionally urethane coated, e.g. about 12 oz/yd$^2$
2. 0.5 mil or 1 mil LDPE intervening film layer
3. +45° Dyneema ® fiber unitape ply layer; 52% resin content, 13.78 gsm FAW, 30 gsm Total Areal Weight
4. 0.5 mil or 1 mil LDPE intervening film layer
5. −45° Dyneema ® fiber unitape ply layer; 52% resin content, 13.78 gsm FAW, 30 gsm Total Areal Weight
6. 0.5 mil or 1 mil LDPE intervening film layer
7. Woven Dyneema ®, 375 d square weave second outer layer, dry; 103 gsm FAW, 1-10% wet-out resin.
8. Urethane or polyester backside film, 1 or 2 mil thick Lamination In various embodiments, any two or more, or all of the layers within a lightweight laminate, may be laminated together at any time. "Lamination," as used herein, is broadly interpreted to include the simple laying together of materials or the pressing together of materials (such as by passing materials through nip rollers or belt presses), and does not necessarily, but can, include heating and/or pressure treatment of layers to produce a stable composite that is not readily teased apart into its constituent layers.

In various embodiments, one or more layers of a lightweight laminate may be laminated together to provide a sub-laminate, and then the sub-laminate may be subsequently layered with additional layers to form the final lightweight laminate.

Lamination may be accomplished by using any combination of breather/vacuum bag, nip rollers, autoclave or belt press, or any other in-line or off-line processes. In various embodiments, the lamination process, including for example heating above ambient, suffices to melt one or more intervening film layers previously disposed between various adjacent layers. In various embodiments, one or more intervening film layers function as adhesive film, whereby melting and flowing and subsequent cooling after lamination results in adjacent layers indirectly bonded by the adhesive film. In various embodiments, melting and flowing of film layers results in an intermingling with adjacent resins to the point where original intervening film layers are undetectable after lamination is concluded. Comingling of resins may provide hybrid resin systems in the instances where chemical composition of the resins is different.

In various embodiments, a sub-laminate can be sold to another manufacturer for lamination of the final layer(s), (e.g. such as lamination of the first outer layer to the remaining sub-laminate comprising the internal reinforcing layers and the second outer layer). In various embodiments, a sub-laminate comprising multiple reinforcing layers may be constructed first as a sub-laminate.

In various embodiments, the second outer layer may be applied in a dry state to either the first outer layer or to the one or more internal reinforcing layers, and then later wet-out with a wet-out resin or wet-out with resin infiltrating in from an adjacent layer, such as an adjacent high resin content unitape or other resin-containing layer. In other embodiments, the second outer layer comprises a pre-preg comprising a wet-out resin.

In various embodiments, a method of producing a lightweight laminate comprises: (a) forming a stack comprising: (i) a first outer layer; (ii) a second outer layer; and optional intervening film layer; and (b) laminating said stack, wherein said second outer layer is saturated, partially saturated and coated, or partially coated with a wet-out resin infiltrated therein from at least one of: (i) a high resin content unitape in contact with either or both sides of the second outer layer; (ii) a resin coated onto, or resin film applied to, the side of the second outer layer opposite the first outer layer; or (iii) a backside film layer (having resin) placed into contact with the side of the second outer layer opposite the first outer layer.

In various embodiments, a method of producing a lightweight laminate comprises the step of laminating together (i) a first outer layer; (ii) at least one internal reinforcing layer; (iii) a second outer layer; and (iv) optionally, one or more intervening film layers, such that said first and second outer layers sandwich the at least one internal reinforcing layer, wherein the second outer layer is saturated, partially saturated and coated, or partially coated with a wet-out resin. In various embodiments, the second outer layer comprises a pre-preg further comprising said wet-out resin. In various embodiments where there are two or more internal reinforcing layers, one or more intervening film layers are optionally disposed between any two adjacent internal reinforcing layers. In various embodiments, the method further includes a backside film.

In various embodiments, a method of producing a lightweight laminate comprises the steps of (a) forming a stack comprising (i) a first outer layer; (ii) at least one internal reinforcing layer; (iii) optionally, one or more intervening film layers; and (iv) a second outer layer saturated, partially saturated and coated, or partially coated with a wet-out resin; and (b) laminating said stack, wherein said first and second outer layers sandwich the at least one internal reinforcing layer. In various embodiments, said second outer layer comprises a pre-preg comprising said wet-out resin. In various embodiments, said stack further comprises a backside film such that after the lamination step the backside film is disposed on the outside of the laminate and bonded to the second outer layer.

In various embodiments, a method of producing a lightweight laminate comprises: (a) laminating together at least two internal reinforcing layers optionally separated by one or more intervening film layers to form a reinforcing core layer; (b) laminating a first outer layer to one side of said reinforcing core layer; (c) laminating a second outer layer to the other side of said reinforcing core layer, wherein said outer surface layer is saturated, partially saturated and coated, or partially coated with a wet-out resin. In various embodiments, additional intervening film layers are used to separate/bond the first outer layer and/or the second outer layer to the reinforcing core layer. In various embodiments, said method further comprises the step of adding a backside film to the exposed side of the second outer layer. In various embodiments, said second outer layer comprises a pre-preg comprising said wet-out resin. In various embodiments, said internal reinforcing layers comprise unitape.

In various embodiments, a method of producing a lightweight laminate comprises: (a) laminating together at least two unitape layers to form a reinforcing core layer, said core layer optionally comprising one or more intervening film layers disposed between unitape layers; (b) laminating a first outer layer to one side of said reinforcing core layer; (c) laminating a second outer layer to the other side of said reinforcing core layer; and (d) wetting-out the exposed side of said second outer layer with at least one wet-out resin. In various embodiments of the method, the step of wetting-out the second outer layer comprises infiltration of wet-out resin from at least one of: (i) a high resin content unitape in contact with either or both sides of the second outer layer; (ii) a resin coated onto, or resin film applied to, the side of the second outer layer opposite the first outer layer; or (iii) a backside film layer (having resin) placed into contact with the side of the second outer layer opposite the first outer layer. In various embodiments, additional intervening film layers are used to separate/bond the first outer layer and/or the second outer layer to the reinforcing core layer. In various embodiments, said method further comprises the step of adding a backside film to the second outer layer on the side of the wet-out resin. In various embodiments, addition of said backside film coincides with said step of wetting-out said second outer layer. In various embodiments, the step of adding a backside film to the second outer layer supplies the wet-out resin for wetting-out the second outer layer.

In various embodiments, a method of producing a lightweight laminate comprises: (a) laminating together at least two internal reinforcing layers to form a reinforcing core layer, said core layer optionally comprising one or more intervening film layers disposed between unitape layers; (b) laminating a first outer layer to one side of said reinforcing core layer; (c) laminating a second outer layer to the other side of said reinforcing core layer; and (d) wetting-out the exposed side of said second outer layer with at least one wet-out resin. In various embodiments, additional intervening film layers are used to separate/bond the first outer layer and/or the second outer layer to the reinforcing core layer. In various embodiments, said method further comprises the step of adding a backside film to the second outer layer opposite the wet-out resin. In various embodiments, addition of said backside film coincides with said step of wetting-out said second outer layer. In various embodiments, said second outer layer comprises a pre-preg comprising said wet-out resin. In various embodiments, said internal reinforcing layers comprise unitape layers.

In various embodiments, a method of producing a lightweight sub-laminate comprises: (a) laminating together at least two unitape layers to form a reinforcing core layer, said core layer optionally comprising one or more intervening film layers disposed between unitape layers; (b) laminating a second outer layer to one side of said reinforcing core layer; and (c) wetting-out the exposed side of said second outer layer with at least one wet-out resin. In various embodiments, an additional intervening film layer is used to separate/bond the second outer layer to the reinforcing core layer. In various embodiments, said method further comprises the step of adding a backside film to the second outer layer on the same side as the wet-out resin. In various embodiments, addition of said backside film coincides with said step of wetting-out said second outer layer. In various embodiments, a method of producing an article of manufacture such as a plate-carrier vest comprises the step of laminating a first outer layer to the exposed side of the reinforcing core layer of said sub-laminate. In various embodiments, said first outer layer is printed with a camouflage color/pattern.

In various embodiments, layers within a multilayered lightweight laminate material can be combined and cured together using pressure and temperature, either by passing the stacked layers through a heated set of nips rolls, a heated press, a heated vacuum press, a heated belt press, or by placing the stack of layers into a vacuum lamination tool and exposing the stack to heat. Vacuum lamination tools can be covered with a vacuum bag and sealed to the lamination tool with a vacuum applied to provide pressure. Moreover, external pressure, such as available in an autoclave, can be used in the manufacture of various embodiments of the lightweight laminate herein, and may be used to increase the pressure exerted on the layers. The combination of pressure and vacuum that the autoclave provides results in flat, thin, and well consolidated materials.

Under appropriate circumstances, considering such issues as design preference, user preferences, marketing preferences, cost, structural requirements, available materials, technological advances, etc., any other conceivable lamination method(s) may suffice.

Modification of the Properties of the Lightweight Laminate and/or Materials of Construction Thereof, and Articles of Manufacture Such as Military or Recreational Apparel and Gear Comprising the Lightweight Laminate.

Fire retardancy, self-extinguishing property, and/or resistance to melting, charring and/or burning, may be deemed desirable or even necessary when considering particular uses for the lightweight laminate material disclosed herein. As such, there are numerous ways to give the lightweight laminate of the present disclosure any or all of these properties.

In various embodiments of the present disclosure, any of the components (fibers, resins, unitape sheets, etc.) of the lightweight laminate disclosed herein may be inherently fire retardant and/or self-extinguishing. If not fire retardant and/or self-extinguishing, any of the components may be treated for fire retardancy/self-extinguishing property by the supplier of the component. Alternatively, any component of the lightweight laminate may be coated and/or infused with fire retardant and/or extinguishing compounds during the manufacturing of any layer, intermediate sub-laminate, the lightweight laminate product, or during or after construction of a finished article of manufacture comprising the lightweight laminate.

In various embodiments, lightweight laminates in accordance with the present disclosure have self-extinguishing and/or fire retardancy properties from interaction of different constituent layers.

In various embodiments, fire retarding and/or extinguishing materials can be added to individual monofilaments when the filaments are extruded or pultruded, to finished fibers, to weaves, to resins used to impregnate fibers, to adhesives used between layers, to membranes, films, and the like, (such as by adding materials to the liquid resins prior to curing and setting), or to commercial felts, nonwovens or woven cloths.

In various embodiments, a fire retardant adhesive or non-adhesive resin can be used, or fire retardant/extinguishing chemicals can be added to an otherwise flammable chemical or membrane to improve the flame resistance.

Non-limiting examples of fire retardant additives include: DOW D.E.R. 593 Brominated Resin, Dow Corning 3 Fire Retardant Resin, and polyurethane resin with Antimony Trioxide (such as EMC-85/10A from PDM Neptec ltd.), although other fire retardant additives may also be suitable. Fire retardant additives that may be used to improve flame resistance include Fyrol FR-2, Fyrol HF-4, Fyrol PNX, Fyrol 6, and SaFRon 7700, although other additives may also be suitable.

Fire retardancy and self-extinguishing properties can also be added to the fibers either by using fire retardant fibers such as Nomex® or Kevlar®, carbon fiber, ceramic fiber, or metallic wire filaments, direct addition of fire retardant compounds to the fiber formulation during the fiber manufacturing process, or by coating the fibers with a sizing, polymer or adhesive incorporating fire retardant compounds listed above or others as appropriate. Any woven or scrim materials used in the lightweight laminate may be either be pretreated for fire retardancy by the supplier or coated and infused with fire retardant compounds during the manufacturing process.

In various embodiments, a first outer layer of a lightweight laminate comprising same exhibits a property chosen from the group consisting of fire retardancy, self-extinguishing, nonflammable, non-charring, non-melting, high-melting, non-burning, and mixtures thereof.

In various embodiments, an internal reinforcing layer of a lightweight laminate comprising same exhibits a property chosen from the group consisting of fire retardancy, self-extinguishing, nonflammable, non-charring, non-melting, high-melting, non-burning, and mixtures thereof.

In various embodiments, a second outer layer of a lightweight laminate comprising same exhibits a property chosen from the group consisting of fire retardancy, self-extinguishing, nonflammable, non-charring, non-melting, high-melting, non-burning, and mixtures thereof.

In various embodiments, a wet-out resin of a lightweight laminate comprising same exhibits a property chosen from the group consisting of fire retardancy, self-extinguishing, nonflammable, non-charring, non-melting, high-melting, non-burning, and mixtures thereof.

In various embodiments, a backside film of a lightweight laminate comprising same exhibits a property chosen from the group consisting of fire retardancy, self-extinguishing, nonflammable, non-charring, non-melting, high-melting, non-burning, and mixtures thereof.

In various embodiments, a lightweight laminate exhibits a property chosen from the group consisting of fire retardancy, self-extinguishing, nonflammable, non-charring, non-melting, high-melting, non-burning, and mixtures thereof.

In various embodiments, a lightweight laminate exhibits a property chosen from the group consisting of fire retardancy, self-extinguishing, nonflammable, non-charring, non-melting, high-melting, non-burning, and mixtures thereof, wherein said property is achieved through interaction of different constituent layers within said lightweight laminate.

In various embodiments, an article of manufacture comprising a lightweight laminate exhibits a property chosen from the group consisting of fire retardancy, self-extinguishing, nonflammable, non-charring, non-melting, high-melting, non-burning, and mixtures thereof, said article of manufacture comprising any military, law enforcement, or recreation apparel or gear.

In various embodiments, antimicrobial/anti-pathogen resistance can be added to the components of the lightweight laminate disclosed herein by, for example, the incorporation of one or more if antimicrobial agents added or coated onto the polymer resins, film or fabrics, and anti-microbial treatments to the fibers, monofilaments, threads or tows used within the lightweight laminate material.

Typical antimicrobial materials include, but are not limited to, OxiTitan Antimicrobial, nano-silver compounds, sodium pyrithione, zinc pyrithione 2-fluoroethanol, 1-bromo-2-fluoroethane, benzimidazole, Fleroxacin, 1,4-butanedisulfonic acid disodium salt, 2-(2-pyridyl)isothiourea N-oxide hydrochloride, various quarternary ammonium salts, 2-pyridinethiol 1-oxide, compound zinc pyrithione, compound copper pyrithione, magnesium pyrithione, bispyrithione, pyrithione, silver, silver nano-particles, titanium dioxide, and ABC Silica Gel (α-bromo Cinnam-Gel). Fiber forms such as threads, tows and monofilaments can be treated with any one or combination of any of the above-disclosed antimicrobial materials. For example, any one or more of these materials may be applied to the desired fiber form via chemical or electrical plating, vacuum deposition, or coating with a polymer, adhesive or sizing containing the desired antimicrobial material.

In various embodiments, any of a first outer layer, internal reinforcing layer, second outer layer and backside film, comprising part of a lightweight laminate, a finished lightweight laminate product, or an article of manufacture comprising a lightweight laminate, may exhibit antimicrobial properties such as antibacterial, antiviral, anti-mildew, or anti-mold. In various embodiments, an article of manufacture having antimicrobial properties comprises any military, law enforcement, or recreational apparel or gear.

Plate-Carrier Vest and Other Articles of Manufacture for Military, Law Enforcement, Recreational, Household or Personal Use.

In various embodiments, the lightweight laminate product disclosed herein may be used as starting material for the construction of numerous finished articles of manufacture, such as for example, plate-carrier vests, backpacks, tents, pouches, bags, luggage, jackets, antiballistic armor, and many other military, law enforcement, household, personal, and recreational apparel and gear.

In various embodiments, the lightweight laminate in accordance with the present disclosure and articles of manufacture therefrom exhibit antiballistic performance.

In various embodiments, the lightweight laminate in accordance with the present disclosure and articles of manufacture therefrom exhibit non-ballistic performance.

In various embodiments, the lightweight laminate disclosed herein above is cut and fashioned as necessary to permit attachment of hardware, such as for example, buckles, straps, snaps, rivets, and the like, and/or to attach "soft" elements such as webbing, Velcro®, and the like.

In various embodiments, the lightweight laminate disclosed herein above is cut and fashioned as necessary to permit the piecing together of pre-cut lightweight laminate sections to form an article of manufacture such as a piece of apparel. For example, a smaller piece of the lightweight laminate disclosed herein may form a pocket on a vest fashioned from a lightweight laminate.

In various embodiments, any piece of MOLLE may comprise the lightweight laminate in accordance with the present disclosure. One such MOLLE is a non-ballistic or antiballistic plate-carrier. Other examples of MOLLE include, but are not limited to, backpacks, rucksacks, and modular pouches.

In various embodiments of the present disclosure, a military, law enforcement, household, personal, or recreational piece of apparel or gear comprises a lightweight laminate comprising: (a) a first outer layer; and (b) a second outer layer laminated to said first outer layer, wherein said second outer layer is saturated, partially saturated and coated, or partially coated with a wet-out resin. In various embodiments, the second outer layer comprises a pre-preg comprising the wet-out resin. In various embodiments, the second outer layer is applied dry. In various embodiments, the apparel or gear further comprises a backside film disposed on the exposed side (i.e. the outside) of the second outer. In various embodiments, said at least one internal reinforcing layer comprises unitape. In various embodiments, the apparel or gear further comprises multiple unitape reinforcement layers disposed between said first and second outer layers. In various embodiments, the apparel or gear further comprises any one or combination of hardware and soft items. In various embodiments, the apparel or gear further comprises at least one of a pocket, strap, belt, buckle, rivet, snap, netting, hook, loop, Velcro®, microchip, color, and/or camouflage pattern.

In various embodiments of the present disclosure, MOLLE comprises a lightweight laminate comprising: (a) a first outer layer; (b) at least one internal reinforcing layer; and (c) a second outer layer, wherein said first and second outer layers sandwich said at least one internal reinforcing layer and wherein said second outer layer is saturated, partially saturated and coated, or partially coated with a wet-out resin. In various embodiments, said second outer layer comprises a pre-preg. In various embodiments, the second outer layer is applied dry. In various embodiments, the MOLLE further comprises a backside film disposed on the outside of the second outer layer not adjacent to the at least one internal reinforcing layer. In various embodiments, said at least one internal reinforcing layer comprises unitape. In various embodiments, the MOLLE comprises multiple unitape reinforcement layers within said lightweight laminate, forming a structural core with planned directional mechanical attributes. In various embodiments, the MOLLE further comprises any one or combination of hardware and soft items. In various embodiments, the MOLLE further comprises at least one of a pocket, strap, belt, buckle, rivet, snap, netting, hook, loop, Velcro® portion, microchip, color, and/or camouflage pattern.

In various embodiments, said MOLLE comprises a non-ballistic plate-carrier further comprising at least one pocket or other receptacle for holding at least one antiballistic plate.

In various embodiments, said MOLLE comprises an antiballistic plate-carrier having at least some degree of antiballistic character even prior to insertion of at least one antiballistic plate.

In various embodiments, said non-ballistic or antiballistic plate-carrier further comprises one or more fastening elements configured for the attachment of other MOLLE.

It will be apparent to those skilled in the art that various modifications and variations can be made to the present disclosure without departing from the spirit or scope of the disclosure herein. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

What is claimed is:

1. A lightweight laminate comprising: (a) a first outer layer; (b) a second outer layer saturated, partially saturated and coated, or partially coated with a wet-out resin at from about 35% by weight to about 70% by weight, based on the total weight of the second outer layer and said wet-out resin; and (c) at least one internal reinforcing layer disposed between said first and second outer layers, said internal reinforcing layer comprising parallel filaments or monofilaments embedded in a resin matrix.

2. The lightweight laminate of claim 1, wherein said filaments or monofilaments comprise ultra-high molecular weight polyethylene.

3. The lightweight laminate of claim 1, wherein said wet-out resin is present at from about 35% by weight to about 55% by weight, based on the total weight of said second outer layer and said wet-out resin.

4. The lightweight laminate of claim 1, further comprising a backside film bonded by the wet-out resin to said second outer layer, opposite said first outer layer.

5. The lightweight laminate of claim 1, further comprising one or more intervening film layers disposed between at least one of: said first outer layer and said at least one internal reinforcing layer; between said at least one internal reinforcing layer and an adjacent internal reinforcing layer when the number of internal reinforcing layers total at least two; and between said second outer layer and said at least one internal reinforcing layer.

6. The lightweight laminate of claim 1, wherein said second outer layer comprises a woven fabric.

7. A non-ballistic or antiballistic plate-carrier vest comprising: (a) a lightweight laminate comprising: (i) a first outer layer; (ii) at least one internal reinforcing layer; and (iii) a second outer layer, said at least one internal reinforcing layer disposed between said first and second outer layers, and said second outer layer saturated, partially saturated and coated, or partially coated with a wet-out resin at from about 35% by weight to about 70% by weight, based on the total weight of the second outer layer; and (b) at least one of a hardware item and a soft item attached to said lightweight laminate.

8. The non-ballistic or antiballistic plate-carrier vest of claim 7, wherein said reinforcing layer comprises parallel filaments or monofilaments embedded in a resin matrix.

9. The non-ballistic or antiballistic plate-carrier vest of claim 8, wherein said filaments or monofilaments comprise ultra-high molecular weight polyethylene.

10. The non-ballistic or antiballistic plate-carrier vest of claim 8, further comprising one or more intervening film layers disposed between at least one of: said first outer layer and said at least one internal reinforcing layer; between said at least one internal reinforcing layer and an adjacent internal reinforcing layer when the number of internal reinforcing layers total at least two; and between said second outer layer and said at least one internal reinforcing layer.

11. The non-ballistic or antiballistic plate-carrier vest of claim 7, wherein said wet-out resin is present at from about 35% by weight to about 55% by weight, based on the total weight of said second outer layer and said wet-out resin.

12. A method of producing a lightweight laminate comprising: (a) first, laminating a first outer layer, a reinforcing core layer, and a second outer surface layer together such that said reinforcing core layer is disposed between said first and second outer layers, and then, (b) wetting-out said second outer layer with a wet-out resin at from about 35% by weight to about 70% by weight, based on the total weight of the second outer layer and said wet-out resin.

13. The method of claim 12, wherein said reinforcing core layer comprises at least one unitape comprising parallel monofilaments embedded in a resin matrix.

14. The method of claim 13, wherein said monofilaments comprise ultra-high molecular weight polyethylene.

15. The method of claim 13, wherein said step of wetting-out comprises infiltration of resin from said unitape into said second outer layer.

16. The method of claim 12, wherein said second outer layer comprises a woven fabric.

17. The method of claim 12, further including the step of bonding a backside film to the second outer layer opposite said reinforcing core layer.

18. The method of claim 17, wherein said wet-out resin originates from said backside film and bonds said backside film to said second outer layer.

19. The method of claim 17, wherein said backside film comprises a waterproof/breathable membrane.

20. The method of claim 12, wherein said step of wetting-out comprises saturating, partially saturating and coating, or partially coating said second outer layer with said wet-out resin.

21. The method of claim 12, wherein said wet-out resin is present at from about 35% by weight to about 55% by weight, based on the total weight of said second outer layer and said wet-out resin.

22. The method of claim 12, further comprising disposing one or more intervening film layers between at least one of: said first outer layer and said internal reinforcing layer; and between said second outer layer and said internal reinforcing layer, prior to lamination in step (a).

23. The method of claim 12, further comprising a step of laminating at least two unitape layers together to form said reinforcing core layer, prior to lamination in step (a).

* * * * *